(12) United States Patent  (10) Patent No.: US 9,024,918 B2
Cok  (45) Date of Patent: May 5, 2015

(54) DISPLAY APPARATUS WITH PIXEL-ALIGNED ELECTRODE

(71) Applicant: Ronald Steven Cok, Rochester, NY (US)

(72) Inventor: Ronald Steven Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 191 days.

(21) Appl. No.: 13/626,971

(22) Filed: Sep. 26, 2012

(65) Prior Publication Data

US 2014/0085216 A1  Mar. 27, 2014

(51) Int. Cl.
*G06F 3/041* (2006.01)
*G06F 3/044* (2006.01)

(52) U.S. Cl.
CPC .............. *G06F 3/044* (2013.01); *G06F 3/0416* (2013.01); *G06F 2203/04112* (2013.01)

(58) Field of Classification Search
USPC ..................................... 345/156–175, 87, 769
See application file for complete search history.

(56) References Cited

U.S. PATENT DOCUMENTS

| | | | |
|---|---|---|---|
| 3,223,525 A | 12/1965 | Jonker et al. | |
| 5,869,791 A * | 2/1999 | Young | 178/20.01 |
| 6,163,313 A * | 12/2000 | Aroyan et al. | 345/173 |
| 6,380,497 B1 * | 4/2002 | Hashimoto et al. | 200/5 A |
| 6,645,444 B2 | 11/2003 | Goldstein | |
| 6,812,637 B2 * | 11/2004 | Cok et al. | 313/503 |
| 7,663,607 B2 | 2/2010 | Hotelling et al. | |
| 2006/0057502 A1 | 3/2006 | Okada et al. | |
| 2009/0102804 A1 * | 4/2009 | Wong et al. | 345/173 |
| 2010/0026664 A1 * | 2/2010 | Geaghan | 345/174 |
| 2010/0245223 A1 * | 9/2010 | Asako et al. | 345/92 |
| 2010/0295820 A1 * | 11/2010 | Kikin-Gil | 345/175 |
| 2010/0302201 A1 | 12/2010 | Ritter et al. | |
| 2011/0007011 A1 * | 1/2011 | Mozdzyn | 345/173 |
| 2011/0099805 A1 * | 5/2011 | Lee | 29/846 |
| 2011/0289771 A1 * | 12/2011 | Kuriki | 29/829 |
| 2011/0291966 A1 * | 12/2011 | Takao et al. | 345/173 |
| 2012/0031746 A1 | 2/2012 | Hwang et al. | |
| 2012/0044171 A1 * | 2/2012 | Lee et al. | 345/173 |
| 2012/0081330 A1 * | 4/2012 | Park et al. | 345/174 |
| 2012/0162116 A1 * | 6/2012 | Philipp | 345/173 |
| 2012/0162584 A1 * | 6/2012 | Chang et al. | 349/106 |
| 2012/0242606 A1 * | 9/2012 | Mackey | 345/173 |

\* cited by examiner

*Primary Examiner* — Grant Sitta

(74) *Attorney, Agent, or Firm* — Raymond L. Owens

(57) ABSTRACT

A display apparatus includes a display including an array of pixels formed in rows and columns. A touch-screen including a transparent dielectric layer having a row side and an opposed column side is located over the display. An array of row electrodes are formed on the row side and an array of column electrodes are formed on the column side. Each of the row and column electrodes extends exclusively over all of the pixels in a corresponding row or column.

17 Claims, 20 Drawing Sheets

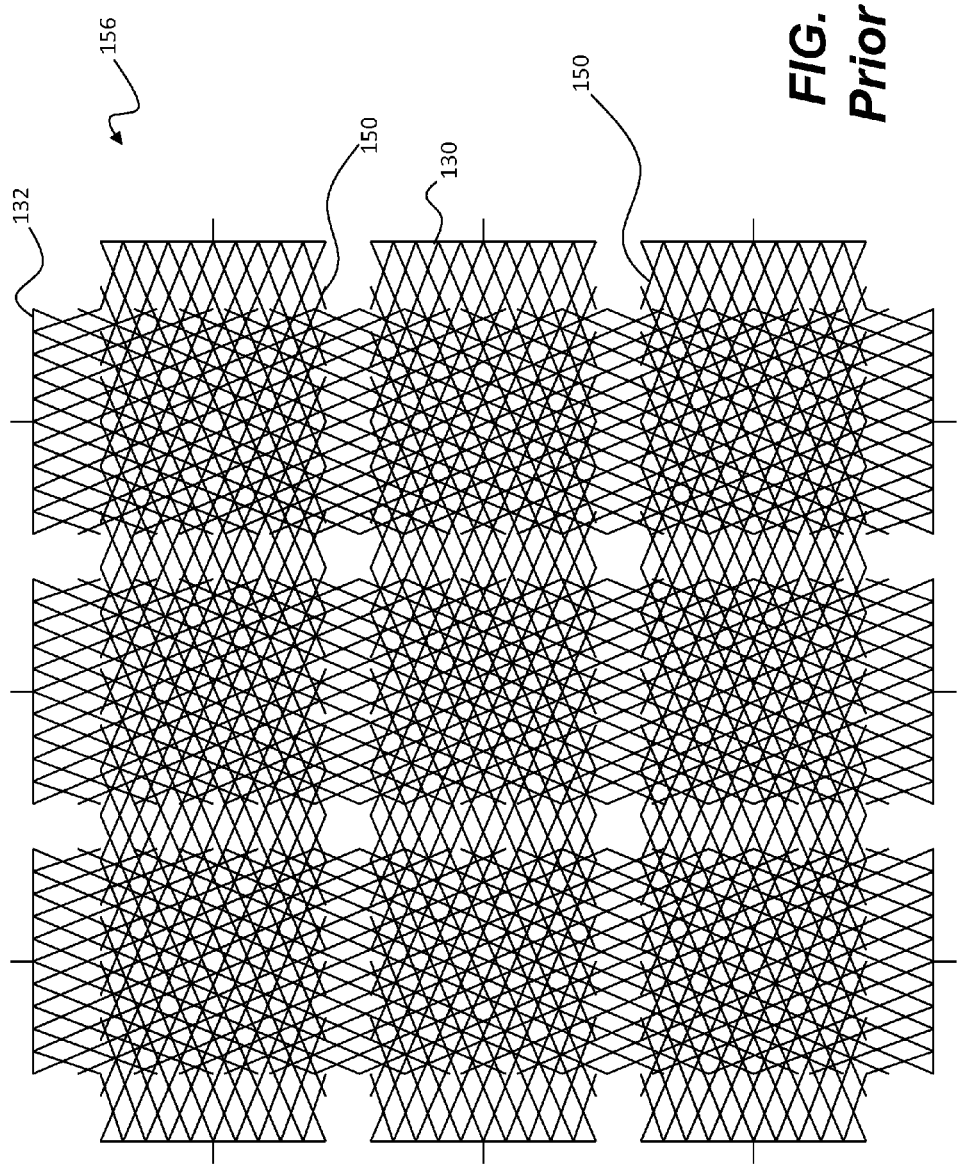

DISPLAY APPARATUS WITH PIXEL-ALIGNED ELECTRODE

CROSS REFERENCE TO RELATED APPLICATIONS

Reference is made to commonly assigned U.S. patent application Ser. No. 13/587,152 filed Aug. 16, 2012, entitled "Display Apparatus With Pixel-Aligned Micro-Wire Electrode" by Ronald S. Cok; U.S. patent application Ser. No. 13/626,914 filed concurrently herewith, entitled "Pixel-Aligned Ground Micro-Wire Device" by Ronald S. Cok; U.S. patent application Ser. No. 13/626/962 filed concurrently herewith, entitled "Pixel-Aligned Electrode Device" by Ronald S. Cok; and U.S. patent application Ser. No. 13/626,979 filed concurrently herewith, entitled "Making Display Device With Pixel-Aligned Electrode" by Ronald S. Cok, the disclosures of which are incorporated herein.

FIELD OF THE INVENTION

The present invention relates to micro-wire electrodes incorporated into capacitive touch-screens in association with displays.

BACKGROUND OF THE INVENTION

Transparent conductors are widely used in the flat-panel display industry to form electrodes that are used to electrically switch light-emitting or light-transmitting properties of a display pixel, for example in liquid crystal or organic light-emitting diode displays. Transparent conductive electrodes are also used in touch screens in conjunction with displays. In such applications, the transparency and conductivity of the transparent electrodes are important attributes so that they do not inhibit the visibility of the displays. In general, it is desired that transparent conductors have a high transparency (for example, greater than 90% in the visible spectrum) and a low electrical resistivity (for example, less than 10 ohms/square).

Touch screens with transparent electrodes are widely used with electronic displays, especially for mobile electronic devices. Such devices typically include a touch screen mounted over an electronic display that displays interactive information. Touch screens mounted over a display device are largely transparent so a user can view displayed information through the touch-screen and readily locate a point on the touch-screen to touch and thereby indicate the information relevant to the touch. By physically touching, or nearly touching, the touch screen in a location associated with particular information, a user can indicate an interest, selection, or desired manipulation of the associated particular information. The touch screen detects the touch and then electronically interacts with a processor to indicate the touch and touch location on the touch screen. The processor can then associate the touch and touch location with displayed information to execute a programmed task associated with the information. For example, graphic elements in a computer-driven graphic user interface are selected or manipulated with a touch screen mounted on a display that displays the graphic user interface.

Touch screens use a variety of technologies, including resistive, inductive, capacitive, acoustic, piezoelectric, and optical technologies. Such technologies and their application in combination with displays to provide interactive control of a processor and software program are well known in the art. Capacitive touch-screens are of at least two different types: self-capacitive and mutual-capacitive. Self-capacitive touch-screens employ an array of transparent electrodes, each of which in combination with a touching device (e.g. a finger or conductive stylus) forms a temporary capacitor whose capacitance is detected. Mutual-capacitive touch-screens can employ an array of transparent electrode pairs that form capacitors whose capacitance is affected by a conductive touching device. In either case, each capacitor in the array is tested to detect a touch and the physical location of the touch-detecting electrode in the touch-screen corresponds to the location of the touch. For example, U.S. Pat. No. 7,663,607 discloses a multipoint touch-screen having a transparent capacitive sensing medium configured to detect multiple touches or near touches that occur at the same time and at distinct locations in the plane of the touch panel and to produce distinct signals representative of the location of the touches on the plane of the touch panel for each of the multiple touches. The disclosure teaches both self- and mutual-capacitive touch-screens.

Referring to FIG. 16, a prior-art display and touch-screen apparatus 100 includes a display 110 with a corresponding touch screen 120 mounted with the display 110 so that information displayed on the display 110 can be viewed through the touch screen 120. Graphic elements displayed on the display 110 are selected, indicated, or manipulated by touching a corresponding location on the touch screen 120. The touch screen 120 includes a first transparent substrate 122 with first transparent electrodes 130 formed in the x dimension on the first transparent substrate 122 and a second transparent substrate 126 with second transparent electrodes 132 formed in the y dimension facing the x-dimension first transparent electrodes 130 on the second transparent substrate 126. A transparent dielectric layer 124 is located between the first and second transparent substrates 122, 126 and first and second transparent electrodes 130, 132. Referring also to the plan view of FIG. 17, in this example first pad areas 128 in the first transparent electrodes 130 are located adjacent to second pad areas 129 in the second transparent electrodes 132. (The first and second pad areas 128, 129 are separated into different parallel planes by the transparent dielectric layer 124.) The first and second transparent electrodes 130, 132 have a variable width and extend in orthogonal directions (for example as shown in U.S. Patent Application Publication Nos. 2011/0289771 and 2011/0099805). When a voltage is applied across the first and second transparent electrodes 130, 132, electric fields are formed between the first pad areas 128 of the x-dimension first transparent electrodes 130 and the second pad areas 129 of the y-dimension second transparent electrodes 132.

A display controller 142 (FIG. 16) connected through electrical buss connections 136 controls the display 110 in cooperation with a touch-screen controller 140. The touch-screen controller 140 is connected through electrical buss connections 136 and wires 134 and controls the touch screen 120. The touch-screen controller 140 detects touches on the touch screen 120 by sequentially electrically energizing and testing the x-dimension first and y-dimension second transparent electrodes 130, 132.

Referring to FIG. 18, in another prior-art embodiment, rectangular first and second transparent electrodes 130, 132 are arranged orthogonally on first and second transparent substrates 122, 126 with intervening transparent dielectric layer 124, forming touch screen 120 which, in combination with the display 110 forms the touch screen 120 and display apparatus 100. In this embodiment, first and second pad areas 128, 129 coincide and are formed where the first and second transparent electrodes 130, 132 overlap. The touch screen 120 and display 110 are controlled by touch screen and display controllers 140, 142, respectively, through electrical busses 136 and wires 134.

Since touch-screens are largely transparent so as not to inhibit the visibility of the displays over which the touch-screens are located, any electrically conductive materials located in the transparent portion of the touch-screen either employ transparent conductive materials or employ conductive elements that are too small to be readily resolved by the eye of a touch-screen user. Transparent conductive metal oxides are well known in the display and touch-screen industries and have a number of disadvantages, including limited transparency and conductivity and a tendency to crack under mechanical or environmental stress. This is particularly problematic for flexible touch-screen-and-display systems. Typical prior-art conductive electrode materials include conductive metal oxides such as indium tin oxide (ITO) or very thin layers of metal, for example silver or aluminum or metal alloys including silver or aluminum. These materials are coated, for example, by sputtering or vapor deposition, and are patterned on display or touch-screen substrates, such as glass. However, the current-carrying capacity of such electrodes is limited, thereby limiting the amount of power that can be supplied to the pixel elements. Moreover, the substrate materials are limited by the electrode material deposition process (e.g. sputtering). Thicker layers of metal oxides or metals increase conductivity but reduce the transparency of the electrodes.

Various methods of improving the conductivity of transparent conductors are taught in the prior art. For example, U.S. Pat. No. 6,812,637 describes an auxiliary electrode to improve the conductivity of the transparent electrode and enhance the current distribution. Such auxiliary electrodes are typically provided in areas that do not block light emission, e.g., as part of a black-matrix structure.

It is also known in the prior art to form conductive traces using nano-particles including, for example silver. The synthesis of such metallic nano-crystals is known. For example, U.S. Pat. No. 6,645,444 describes a process for forming metal nano-crystals optionally doped or alloyed with other metals. U.S. Patent Application Publication No. 2006/0057502 describes fine wirings made by drying a coated metal dispersion colloid into a metal-suspension film on a substrate, pattern-wise irradiating the metal-suspension film with a laser beam to aggregate metal nano-particles into larger conductive grains, removing non-irradiated metal nano-particles, and forming metallic wiring patterns from the conductive grains. However, such wires are not transparent and thus the number and size of the wires limits the substrate transparency as the overall conductivity of the wires increases.

Touch-screens including very fine patterns of conductive elements, such as metal wires or conductive traces are known. For example, U.S. Patent Application Publication No. 2011/0007011 teaches a capacitive touch screen with a mesh electrode, as does U.S. Patent Application Publication No. 2010/0026664. Referring to FIG. 19, a prior-art x- or y-dimension variable-width first or second transparent electrode 130, 132 includes a micro-pattern 156 of micro-wires 150 arranged in a rectangular grid or mesh. The micro-wires 150 are multiple very thin metal conductive traces or wires formed on the first and second transparent substrates 122, 126 (not shown in FIG. 19) to form the x- or y-dimension first or second transparent electrodes 130, 132. The micro-wires 150 are so narrow that they are not readily visible to a human observer, for example 1 to 10 microns wide. The micro-wires 150 are typically opaque and spaced apart, for example by 50 to 500 microns, so that the first or second transparent electrodes 130, 132 appear to be transparent and the micro-wires 150 are not distinguished by an observer.

It is known that micro-wire electrodes in a touch-screen can visibly interact with pixels in a display and various layout designs are proposed to avoid such visible interaction. Furthermore, metal wires can reflect light, reducing the contrast of displays in which the metal wires are present. Thus, the pattern of micro-wires in a transparent electrode is important for optical as well as electrical reasons.

A variety of layout patterns are known for micro-wires used in transparent electrodes. U.S. Patent Application Publication 2010/0302201, U.S. Patent Application Publication No. 2012/0031746, U.S. Patent Application Publication No. 2012/0162116, and U.S. Patent Application Publication No. 2011/0291966 all teach various micro-wire patterns used for electrodes in capacitive touch screens. FIG. 20 illustrates a prior-art example of first and second electrodes 130, 132 having micro-wires 150 arranged in a micro-pattern 156.

In general, the resolution of a touch screen is much lower than the resolution of display devices. The number of distinct touch points in a touch-screen-and-display apparatus is typically smaller than the number of light-controlling pixels. This is, at least partly, because the size of a human finger commonly used to interact with a touch screen is much larger than the smallest visible element on a display. However, as display screens increase in size and are used in a greater variety of locations, they are viewed and interacted with at a greater variety of distances, both far away, for example tens of meters, and close up, for example within touching distance (one meter or less). Thus, in some circumstances one can physically interact with a large display screens, for example using a finger with a touch screen overlaid on a large display screen. In such circumstances, the resolution of the large display screen can be much closer to the resolution of a touch screen overlaid over the large display screen. For such large displays viewed from a touching distance single pixels in the display screen could be resolved. Moreover, larger touch screens required for larger display screens, suffer from limitations resulting from inadequate conductivity of touch-screen electrodes. Resolvable pixels in a large display together with limited resolution in touch screens can cause visual alignment problems for displayed graphic elements with touch screen touch locations.

There is a need, therefore, for an improved method and structure for arranging touch-screen electrodes in a touch-screen-and-display device that improves the usability of the touch screen with respect to the display device.

SUMMARY OF THE INVENTION

In accordance with the present invention, a display apparatus comprises:

a display including an array of pixels formed in rows and columns;

a touch-screen including a transparent dielectric layer having a row side and an opposed column side located over the display, an array of row electrodes formed on the row side and an array of column electrodes formed on the column side; and wherein each of the row and column electrodes extends exclusively over all of the pixels in a corresponding row or column.

The present invention provides a display-and-touch-screen device with improved usability under a wider variety of circumstances, and in particular for very large display screens. The use of micro-wires improves the contrast of the display-and-touch-screen device.

BRIEF DESCRIPTION OF THE DRAWINGS

The above and other features and advantages of the present invention will become more apparent when taken in conjunction with the following description and drawings wherein identical reference numerals have been used to designate identical features that are common to the figures, and wherein:

FIG. 20 is a schematic illustrating prior-art micro-wires arranged in two arrays of orthogonal transparent electrodes.

The Figures are not drawn to scale since the variation in size of various elements in the Figures is too great to permit depiction to scale.

DETAILED DESCRIPTION OF THE INVENTION

Figure 1:
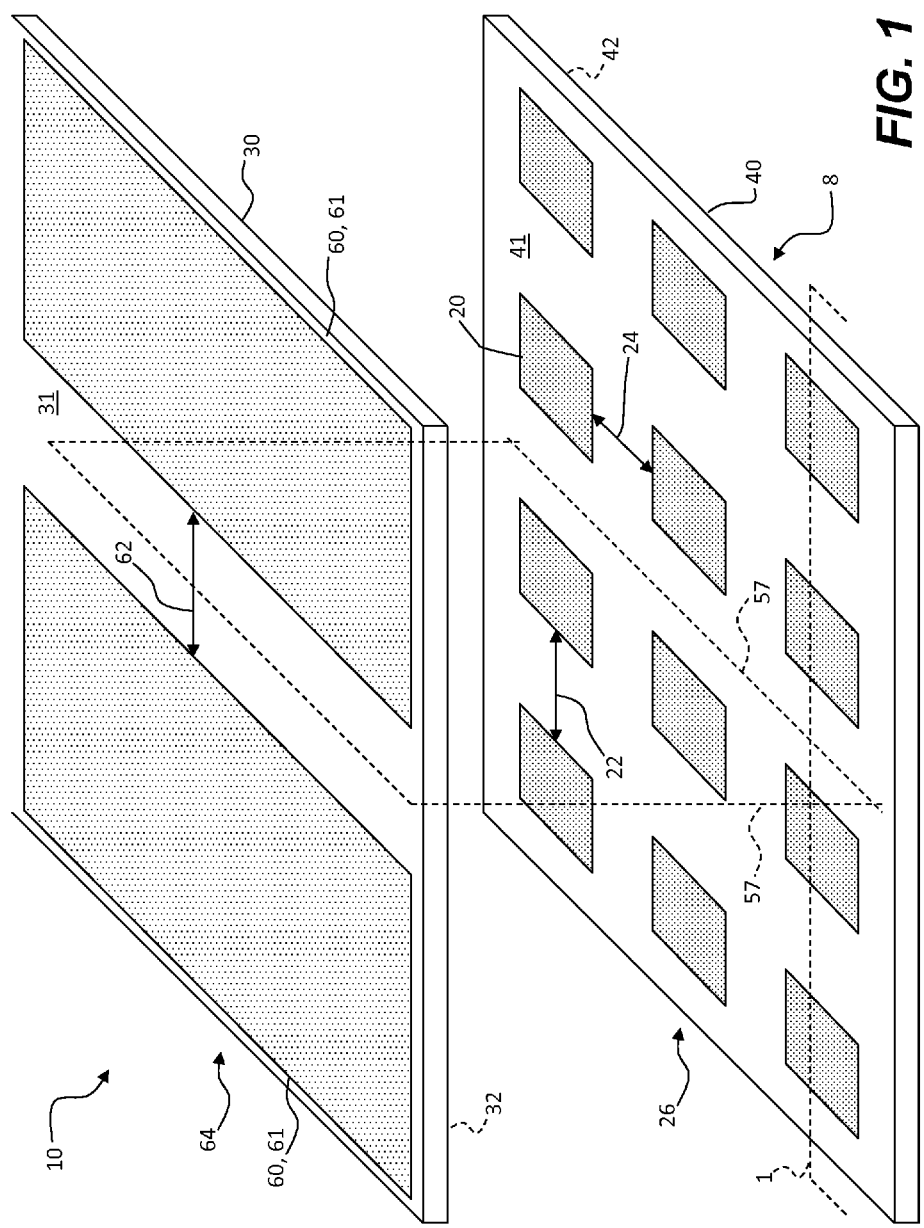
FIG. 1 is an exploded perspective of an embodiment of the present invention.

Referring to FIG. 1 in an embodiment of the present invention, a display device 10 includes a display 8 having an array of pixels 20. Pixels 20 are arranged in rows and column separated by inter-pixel gaps 22, 24 in at least one dimension. In an embodiment, pixels 20 are separated by column inter-pixel gaps 22 between columns of pixels 20 and row inter-pixel gaps 24 between rows of pixels 20. Two or more electrodes 60 in an electrode layer 64 are located over display 8 and extend across at least a portion of the array of pixels 20. Electrodes 60 are separated by an inter-electrode gap 62. To illustrate the location of electrodes 60 with respect to pixels 20, projection lines 57 show the projected location of inter-electrode gap 62 on display substrate 40 between pixels 20 in inter-pixel gap 22.

Electrodes 60 are formed in electrode layer 64. Electrode layer 64 can be a layer on or in a surface of an electrode substrate 30. Electrode substrate 30 can be a transparent dielectric layer. Similarly, pixels 20 can be formed in a display layer 26 different from the electrode layer 64, for example on or in a surface of the display substrate 40 of display 8. Electrode layer 64 can be provided in a common substrate stack with a display layer 26 to form a solid-state layered structure, either laminated or formed on or over a common substrate.

Each electrode 60 in an electrode layer 64 extends exclusively over all of pixels 20 in a row or column. Thus, in one embodiment, electrode 60 extends exclusively over all of pixels 20 in a row. In another embodiment, electrode 60 extends exclusively over all of pixels 20 in a column. By extending exclusively over all of pixels 20 in a row or column is meant that an electrode 60 does not extend over a pixel 20 over which another electrode 60 in the same layer 64 extends. Thus each pixel 20 corresponds to a single electrode 60 in a layer that extends over the pixel 20. In a further embodiment, each electrode in a layer extends exclusively over all of the pixels in multiple adjacent rows or columns. As shown in FIG. 1, each electrode 60 extends exclusively over two adjacent columns of pixels 20.

As illustrated in FIG. 1, electrodes 60 are located over columns of pixels 20, forming column electrodes 61. However, as is understood by those familiar with display design, rows and columns are arbitrary designations of dimensions in a two-dimensional array, such as the array of pixels 20, and can be interchanged. Thus, electrodes 60 could also be formed over rows of pixels 20 simply by rotating either the arrangement of electrodes 60 or the row and column designations of the array of pixels 20. The present invention includes such rotated arrangements and is not limited by the designations of row and column or horizontal or vertical directions.

The rows and column of pixels 20 illustrated in FIG. 1 are shown in straight lines. However, in other embodiments of the present invention, the rows and columns can be arranged so that pixels 20 in rows or columns can be offset with respect to each other so that rows or columns need not be straight. Likewise, electrodes 60 are shown as straight, but need not be.

Displays 8 having pixels 20 can be formed on display substrates 40 using methods known in the art, for example with liquid crystal displays or OLED displays. Display substrates 40 can include a first display substrate side 41 on which pixels 20 are formed in display layer 26 and a substantially parallel opposed second display substrate side 42. Likewise, electrodes 60 can be formed in electrode layer 64 on one, either, or both sides of electrode substrate 30 having a first electrode substrate side 31 and an opposed second electrode substrate side 32. Electrode substrate 30 can also be a transparent dielectric layer. Electrodes 60 can be made of transparent conductive materials such as indium tin oxide or micro-wires 55 (as discussed further below with reference to FIG. 7). Both materials and methods for designing, laying out, and forming such structures are known in the photolithographic arts. For example, mask exposures, etching, sputtering, vacuum deposition, or inkjet deposition can be used to make the structures of the present invention.

Figure 16:
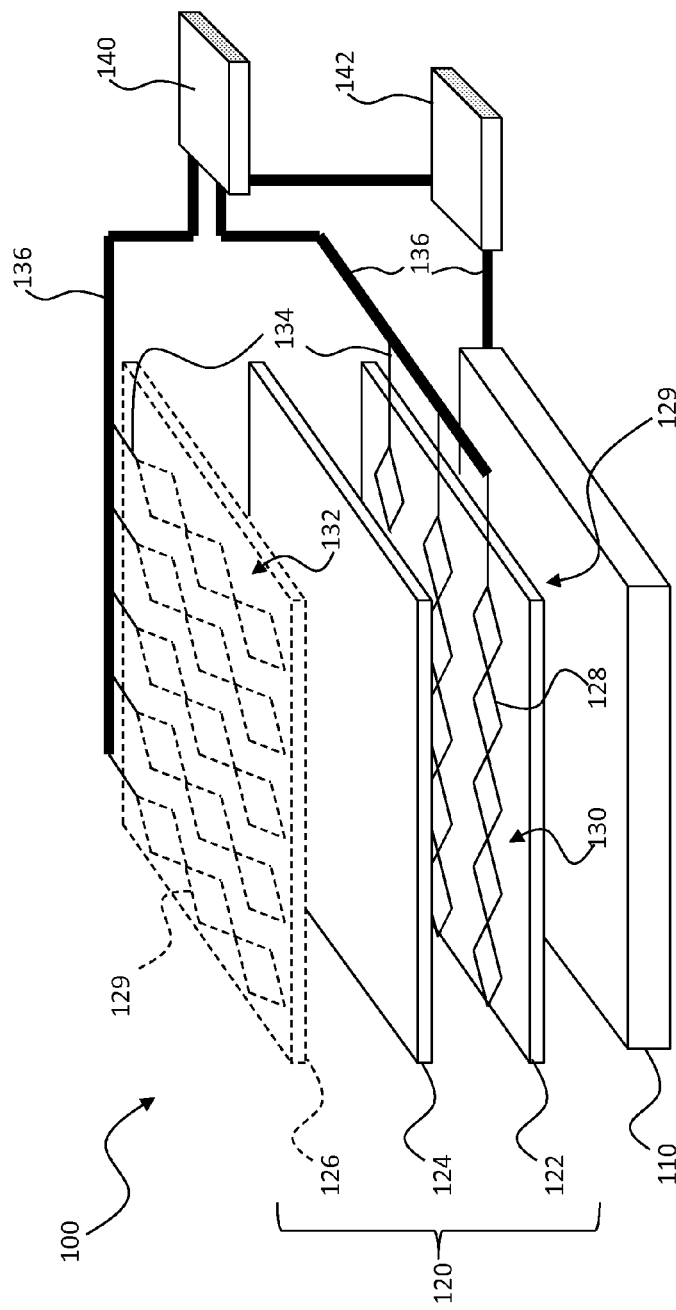
FIG. 16 is an exploded perspective illustrating a prior-art mutual capacitive touch screen having adjacent pad areas in conjunction with a display and controllers.
Figure 17:
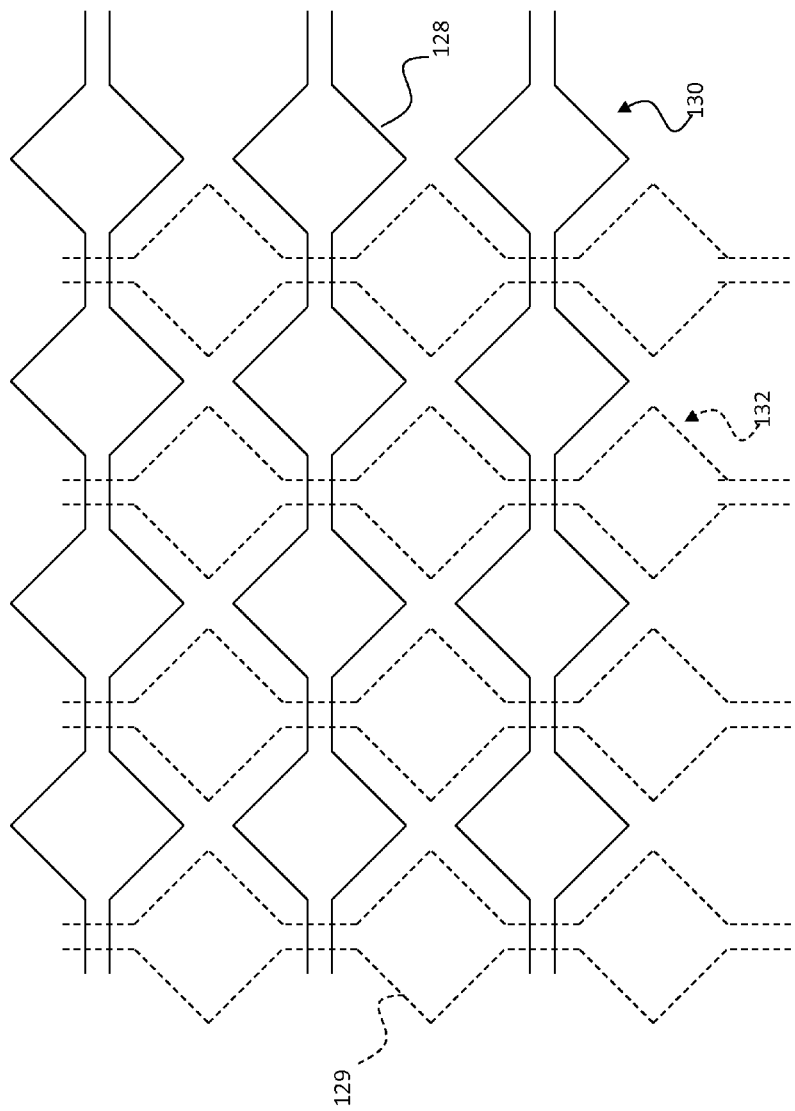
FIG. 17 is a schematic illustrating prior-art adjacent pad areas in a capacitive touch screen.
Figure 18:
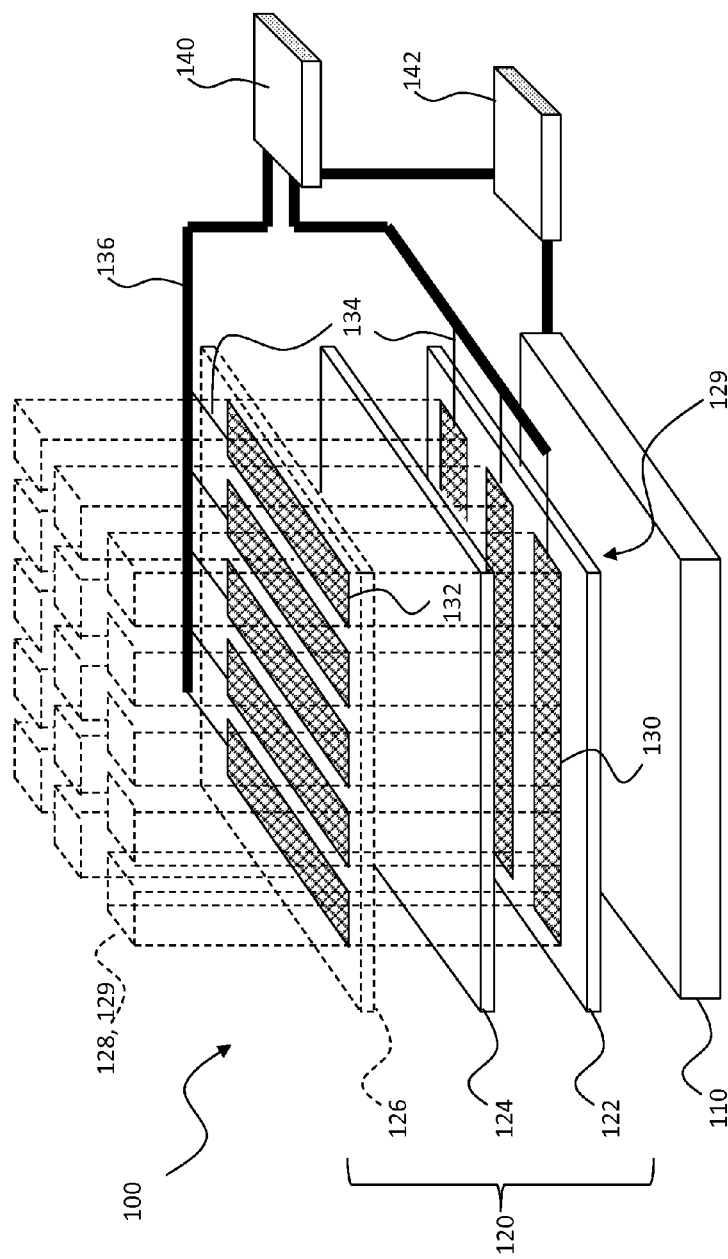
FIG. 18 is an exploded perspective illustrating a prior-art mutual capacitive touch screen having overlapping pad areas in conjunction with a display and controllers.
Figure 19:
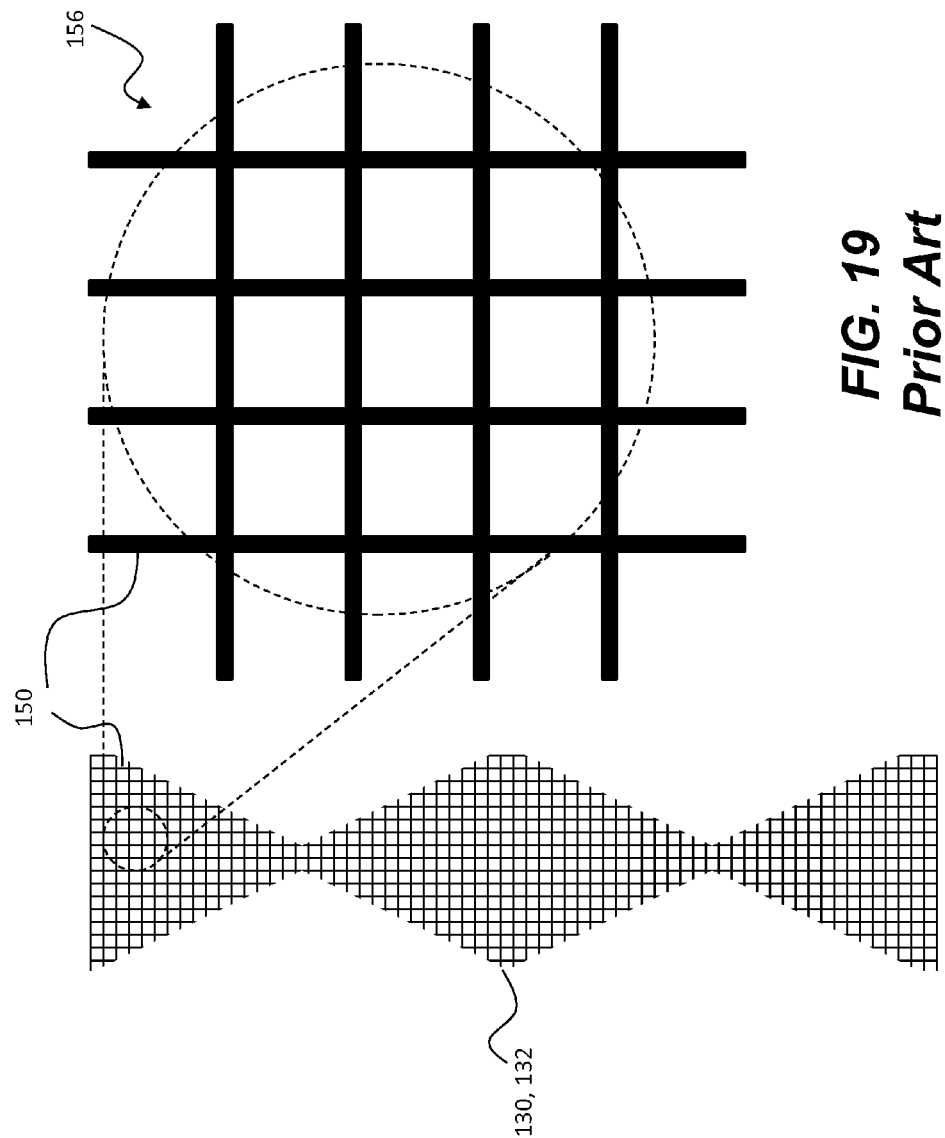
FIG. 19 is a schematic illustrating prior-art micro-wires in an apparently transparent electrode.

Pixels 20 of display 8 can be electrically controlled with electrical signals by display controller 142 (FIG. 16). Similarly, electrodes 60 can be electrically controlled by an electrode control circuit (for example as part of touch-screen controller 140 as shown in FIG. 16). Such circuits can be analog or digital, formed in integrated or discrete circuits and can include processors, logic arrays, programmable logic arrays, memories, and lookup tables and are well known. The design, layout, and control of pixels 20 over display substrates 40 are commonplace in the display industry.

Figure 2:
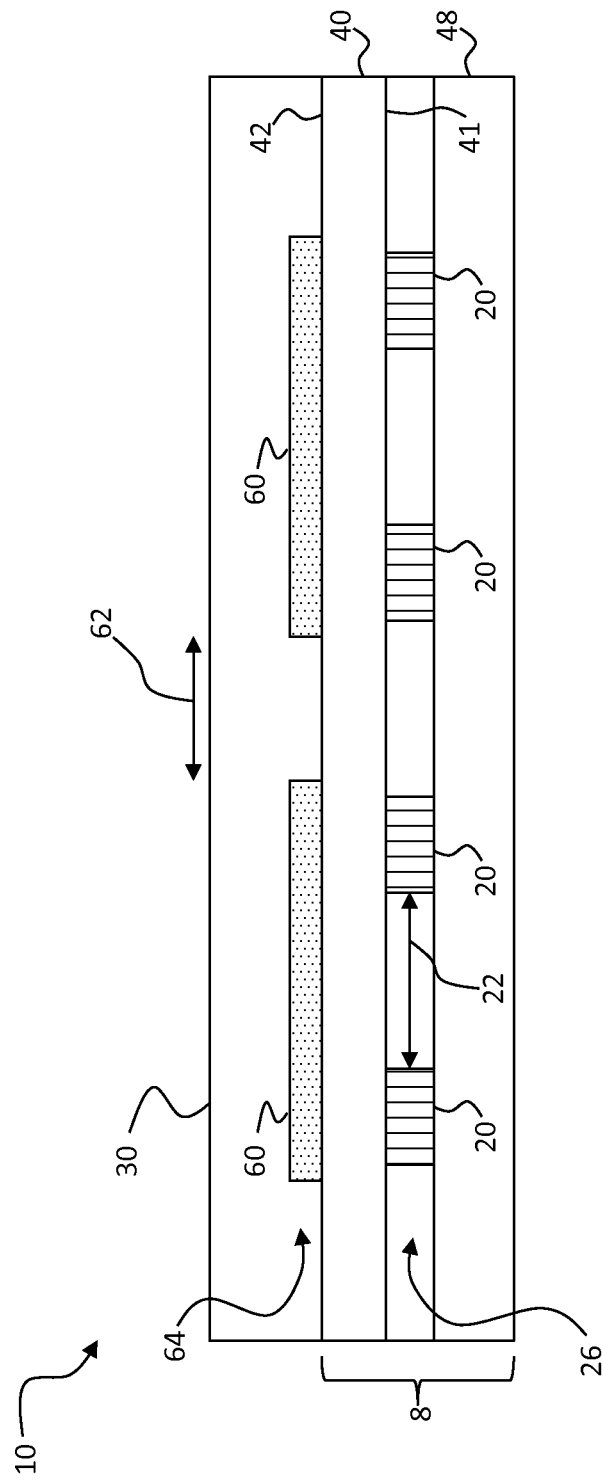
FIG. 2 is a cross section of the embodiment of FIG. 1.

Referring to the illustration of FIG. 2 taken along cross section line 1 of FIG. 1, in an embodiment of the present invention, display 8 is formed on display substrate 40 having first and opposing second display substrate sides 41, 42. Pixels 20 are formed in display layer 26 on first display substrate side 41. Electrodes 60 are formed in electrode layer 64 on second display substrate side 42 or on layers formed on second display substrate side 42. Inter-pixel gaps 22 and inter-electrode gap 62 are illustrated. Display substrate 40 is between electrodes 60 and pixels 20. In this embodiment, therefore, display pixels 20 are formed on one side (first display substrate side 41) of display substrate 40 and electrodes 60 are formed on the opposite side (second display substrate side 42). Pixels 20 are protected by a display cover 48, while electrodes 60 are protected by electrode substrate 30. In other embodiments, electrodes 60 are protected by other protective materials or layers. In this configuration, display substrate 40 is between pixels 20 and electrodes 60.

Figure 3:
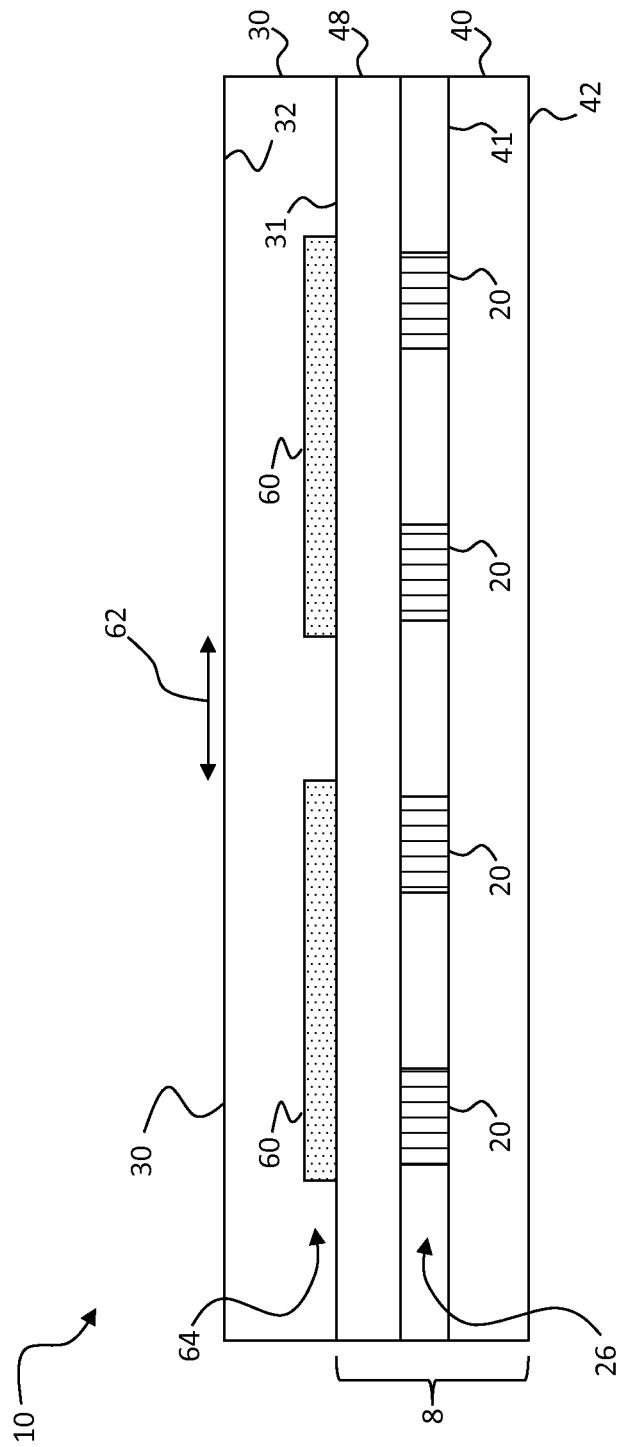
FIGS. 3-4 are cross sections of alternative embodiments of the present invention.

In an alternative embodiment, display pixels 20 are formed on the same side of display substrate 40 as electrodes 60. Referring to FIG. 3, display 8 includes a display substrate 40 with opposing first and second display substrate sides 41 and 42. Pixels 20 are formed in display layer 26 on first display substrate side 41. Display cover 48 protects pixels 20. Electrodes 60 in electrode layer 64 are located over pixels 20 on the same side (first display substrate side 41) of display substrate 40. In an embodiment, electrodes 60 are formed directly on display cover 48 or layers formed on display cover 48. In another embodiment, electrodes 60 are formed on electrode substrate 30 or layers formed on electrode substrate 30 and display substrate 40 and electrode substrate 30 are laminated together. In this configuration, pixels 20 are between display substrate 40 and electrodes 60, as is display cover 48. Display cover 48 can be a separately provided substrate or a protective layer coated over pixels 20. If pixels 20 do not need a protective layer or otherwise incorporate their own protection (e.g. with an insulating or electrode layer), display cover 48 can be eliminated.

Figure 4:
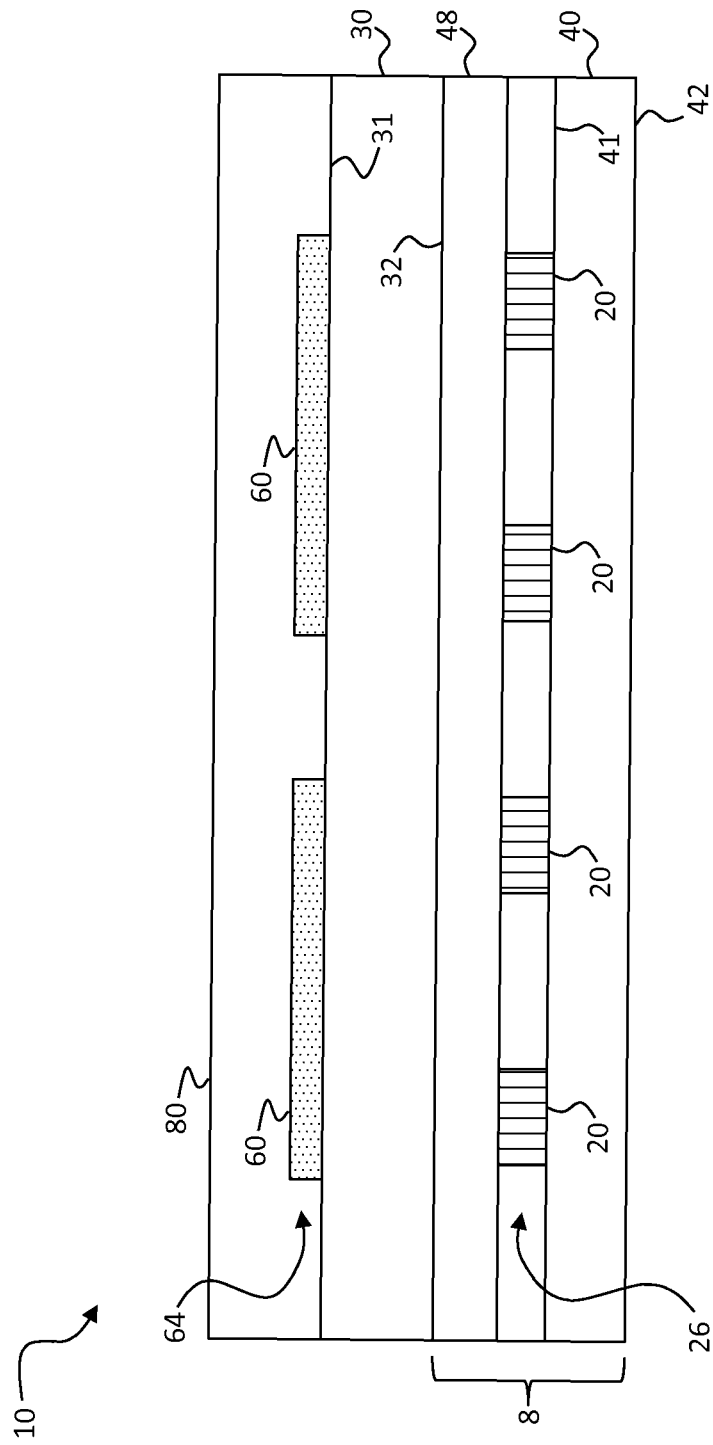

As shown in FIG. 1, display device 10 can include electrode substrate 30. As shown in FIG. 3, electrode substrate 30 has a first electrode substrate side 31 and a substantially parallel second electrode substrate side 32 opposing first electrode substrate side 31. Electrode substrate 30 can be a transparent dielectric layer. Electrodes 60 are formed in electrode layer 64 on first electrode substrate side 31 or on layers formed on first electrode substrate side 31 so that first electrode substrate side 31 is between electrode substrate 30 and display 8. In another embodiment illustrated in FIG. 4, electrodes 60 are formed in electrode layer 64 on first electrode substrate side 31 or on layers formed on first electrode substrate side 31, but electrode substrate 30 is arranged so that second electrode substrate side 32 is between electrode substrate 30 and display 8. A protective layer 80 can protect electrodes 60. Display 8, display substrate 40 having first and second display substrate sides 41, 42, display cover 48, and pixels 20 formed in display layer 26 are as described with respect to FIG. 2.

Figure 5:
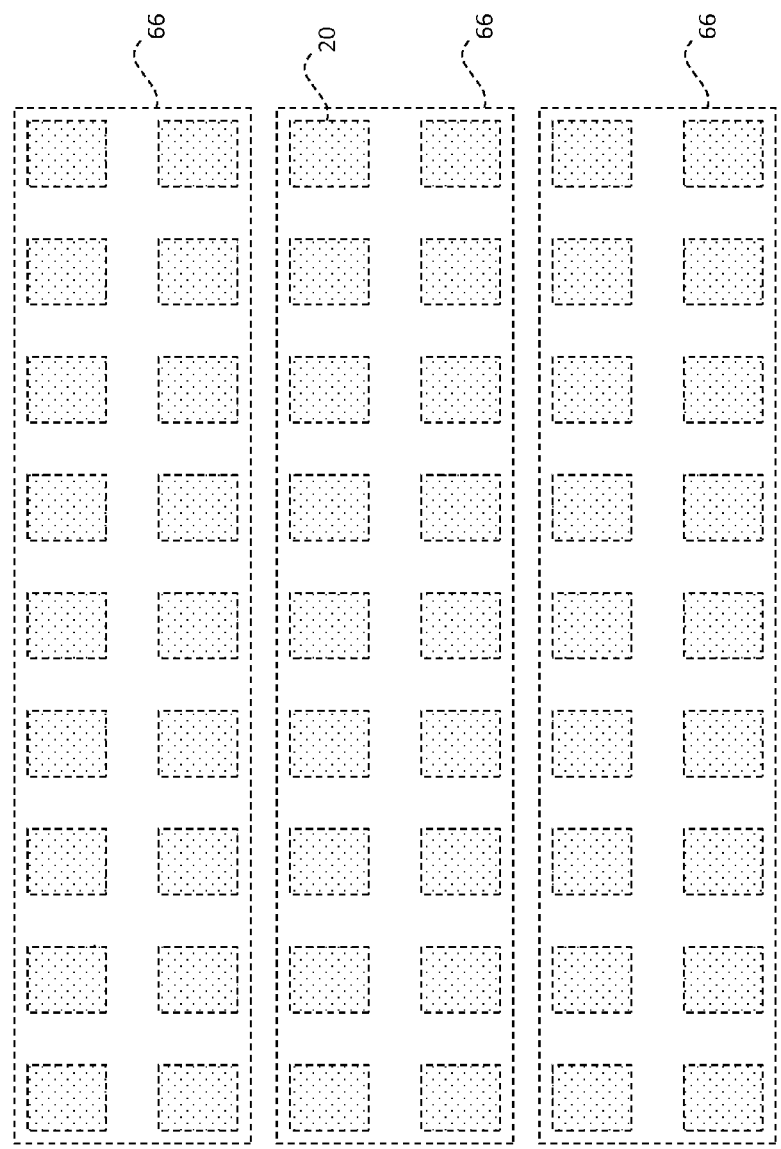
FIGS. 5 and 6 are plan views of row and column electrodes according to embodiments of the present invention.
Figure 6:
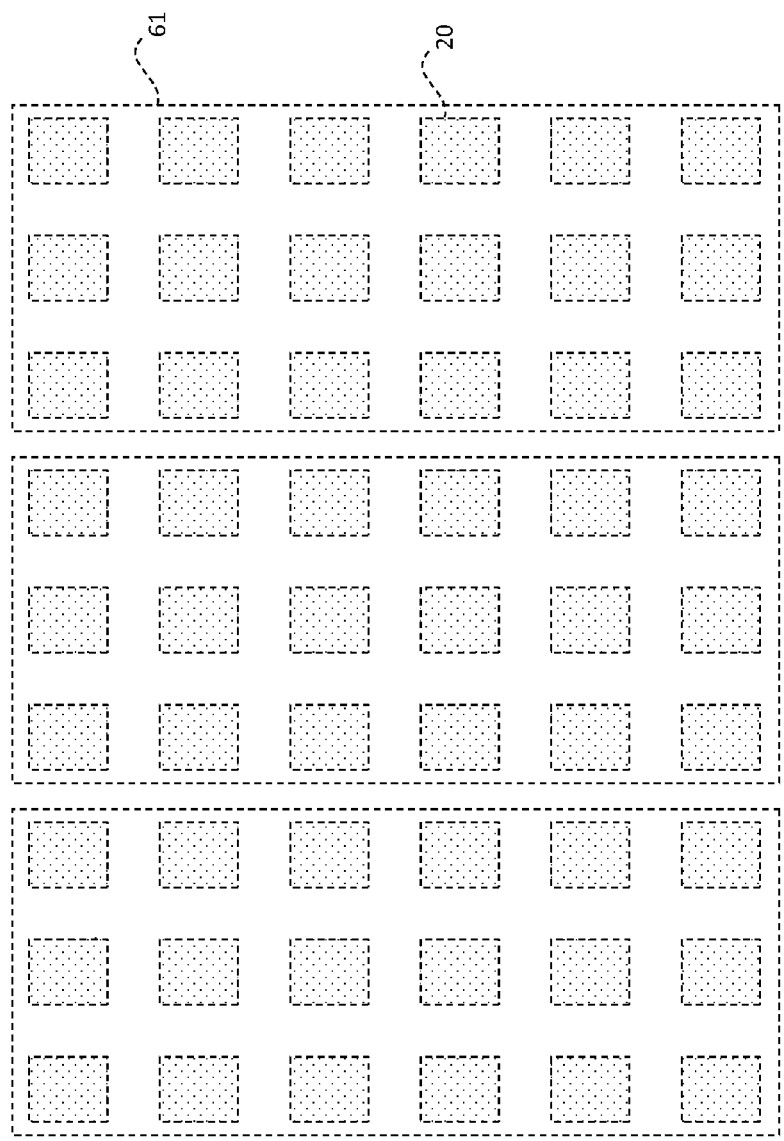

Referring to FIGS. 5 and 6, pixels 20 are arranged in rows and columns to form a two-dimensional array of pixels 20. In FIG. 5, row electrodes 66 each extend exclusively over a portion of the array of pixels 20 so that only one row electrode 66 extends over any one pixel 20. Row electrodes 66 extend exclusively over all of the pixels in two adjacent rows. Referring to FIG. 6, column electrodes 61 each extend exclusively over a portion of the array of pixels 20 so that only one column electrode 61 extends over any one pixel 20. In FIG. 6, column electrodes 61 extend exclusively over all of the pixels in three adjacent columns. Both row electrodes 66 and column electrodes 61 are electrodes 60.

Figure 7:
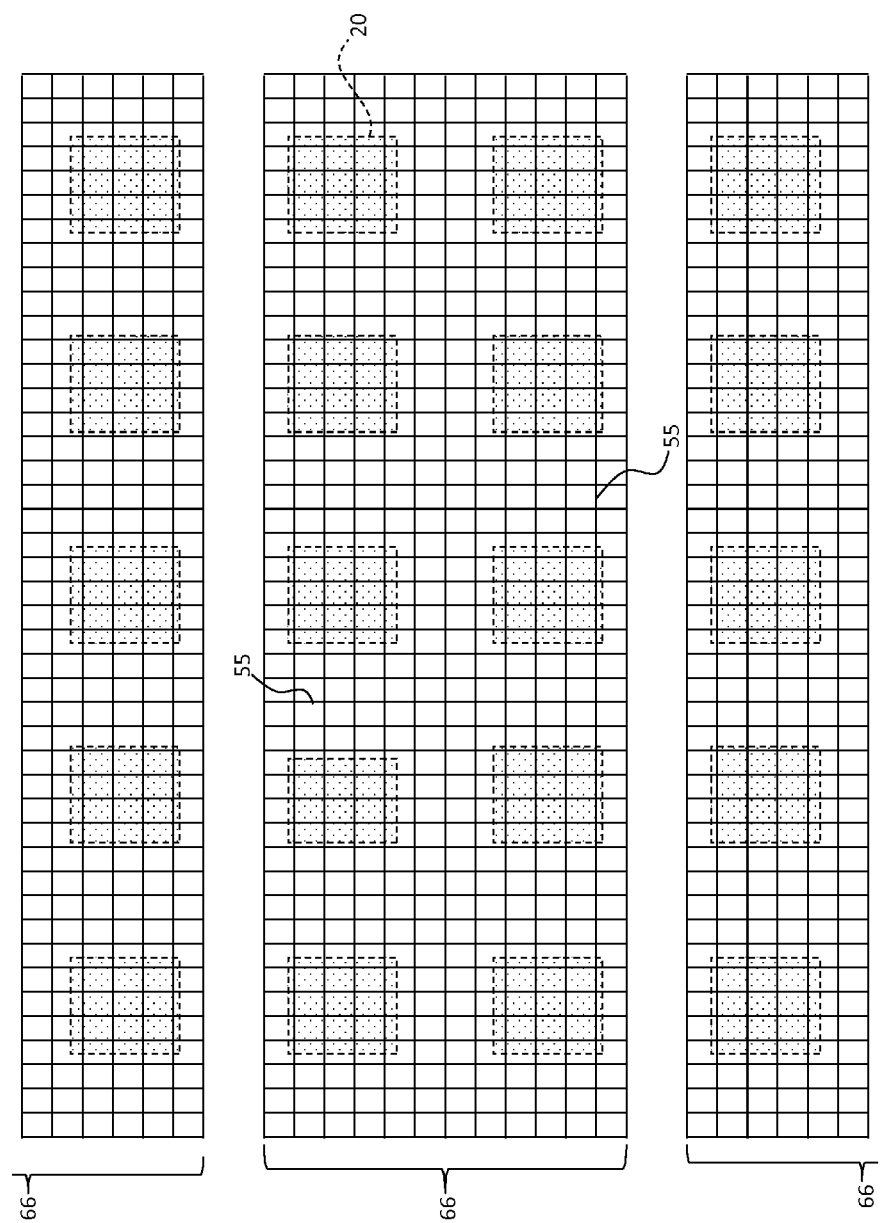
FIG. 7 is a plan view of an embodiment of the present invention having micro-wires.

In an embodiment of the present invention, referring to FIG. 7, row electrodes 66 include electrically connected micro-wires 55. Micro-wires 55 can be partially transparent. At least some of micro-wires 55 can form a straight line. Micro-wires 55 can also be used in column electrodes 61 (not shown).

Figure 8:
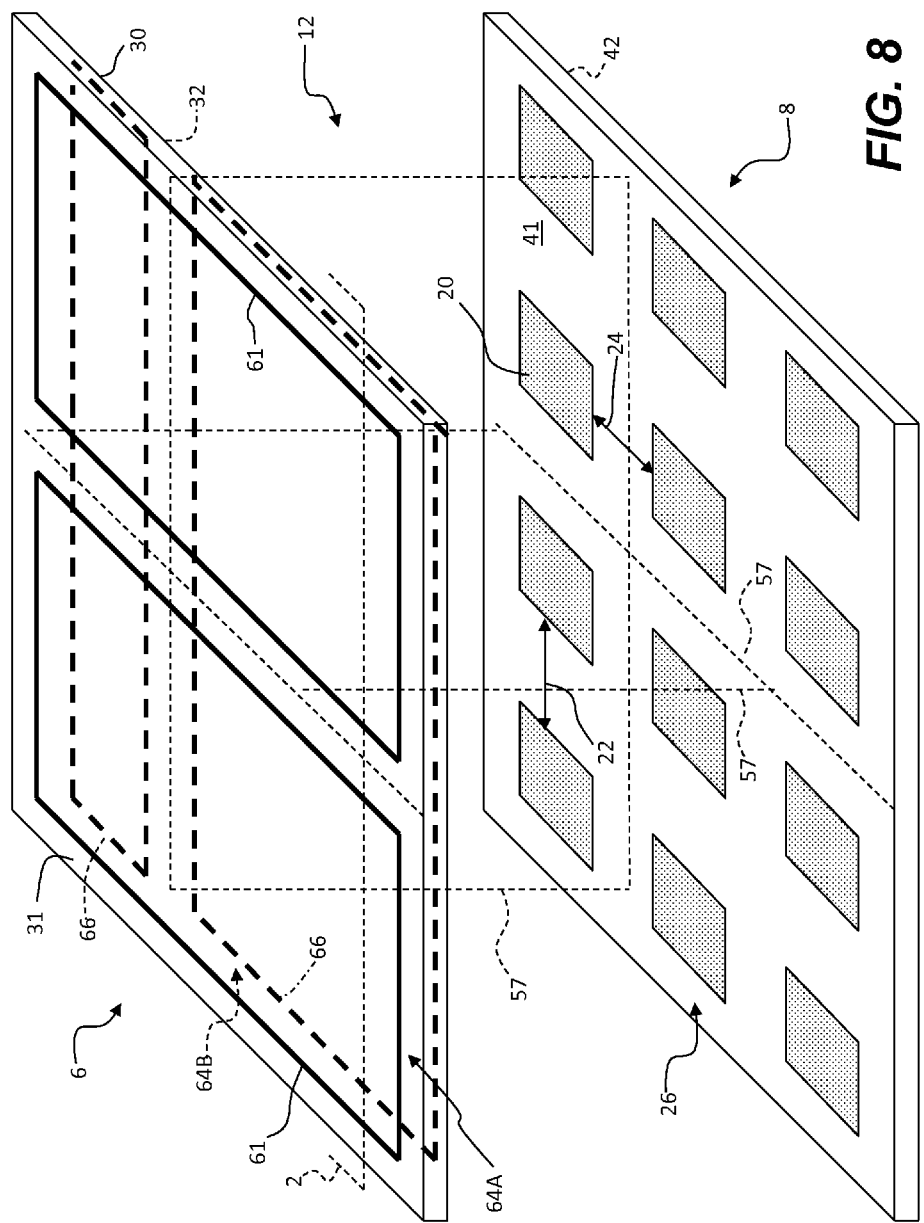
FIG. 8 is an exploded perspective of an embodiment of the present invention.

As shown in FIG. 8, according to another embodiment of the present invention, a display apparatus 12 includes display 8 including the array of pixels 20 formed in rows and columns. In an embodiment, the rows of pixels 20 are separated by row inter-pixel gaps 24 and the columns of pixels 20 are separated by column inter-pixel gaps 22. A touch-screen 6 includes the electrode substrate 30 which can be a transparent dielectric layer having row second electrode substrate side 32 and opposed column first electrode substrate side 31 located over display 8. Touch screen 6 has row electrodes 66 located in a row electrode layer 64B on row side 32 of electrode substrate 30. Column electrodes 61 are located in column electrode layer 64A on the column side of electrode substrate 30 (transparent dielectric layer) so that row and column electrodes 66, 61 are in different layers separated by electrode substrate 30. Each of the row electrodes 66 extends exclusively over all of the pixels 20 in a corresponding row one or more of the row electrodes 66 extends exclusively over all of the pixels 20 in multiple adjacent rows of the array of pixels 20. Each of the column electrodes 61 extends exclusively over all of the pixels 20 in a corresponding column one or more of the column electrodes 66 extends exclusively over all of the pixels 20 in multiple adjacent columns of the array of pixels 20. Row electrodes 66 are formed in row electrode layer 64B and column electrodes 61 are formed in column electrode layer 64A separate from row electrode layer 64B. Row electrodes 66 and column electrode 61 extend in different directions, for example orthogonally. Because they are in different layers, a row electrode 66 and a column electrode 61 can both extend over the same pixel, but no pixel 20 can have two row electrodes 66 or two column electrodes 61 extending over it. Thus, the row electrodes 66 extend exclusively over rows of pixels 20 and column electrodes 61 extend exclusively over columns of pixels 20. In an embodiment, touch screen 6 is a capacitive touch screen.

Pixels 20 can be formed on first display substrate side 41 of display substrate 40 opposite a second display substrate side 42. Projection lines 57 illustrate separated row and column electrodes 66, 61 projected onto display substrate 40 between pixels 20 in column and row inter-pixel gaps 22, 24. The display 8 can include display substrate 40 and the electrode substrate 30 (transparent dielectric layer) is in a common substrate stack with the display substrate 40 to form a multi-layer stack of planar elements in a stack.

Figure 9:
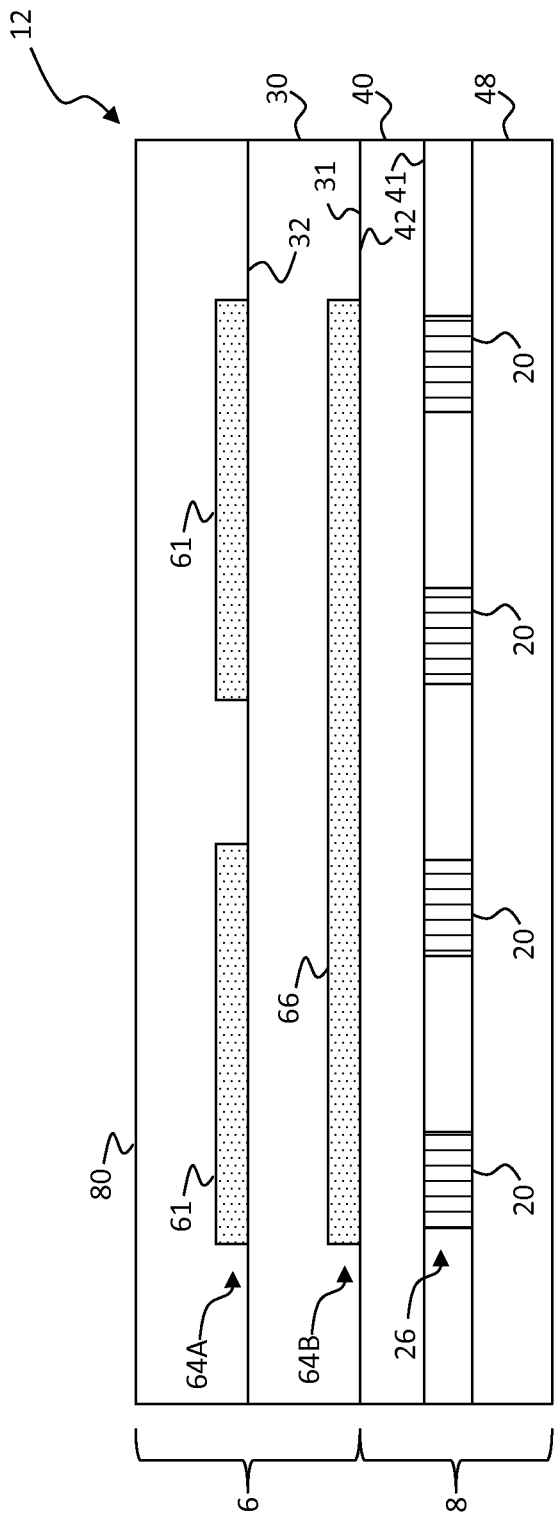
FIGS. 9 and 10 are cross sections of alternative embodiments of the present invention.

Referring to FIG. 9 in a cross section taken through FIG. 8 along line 2, display 8 is formed on display substrate 40. Display substrate 40 has first display substrate side 41 on or over which pixels 20 are formed in display layer 26 and second display substrate side 42 opposing first display substrate side 41. Protective display cover 48 can be formed or located over pixels 20 on first display substrate side 41. Row electrodes 66 are formed in row electrode layer 64B on or over second display substrate side 42 or on layers formed on second display substrate side 42. Electrode substrate 30 (transparent dielectric layer) is formed over row electrodes 66. Column electrodes 61 are formed in column electrode layer 64A over electrode substrate 30. Protective layer 80 can be formed or located over column electrodes 61 to form touch screen 6. Display substrate 40 is between pixels 20 and row electrodes 66. Thus, display 8 is formed on first substrate side 41 and touch screen 6 is formed on second substrate side 42 opposite display 8. This arrangement is useful for a bottom-emitter display device.

Figure 10:
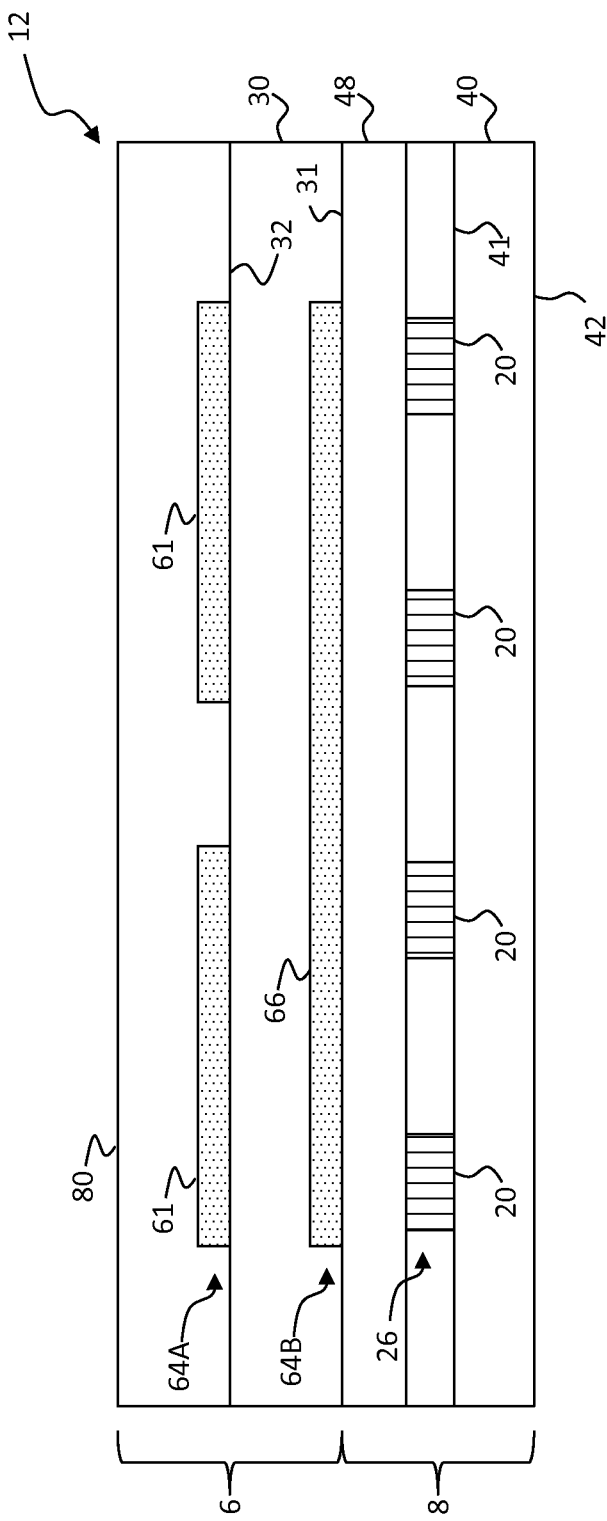

Referring to FIG. 10 in an alternative embodiment, display 8 is formed on display substrate 40. Display substrate 40 has first display substrate side 41 on or over which pixels 20 are formed in display layer 26 and second display substrate side 42 opposing first display substrate side 41. Row electrodes 66 are formed in row electrode layer 64B on or over first display substrate side 41 or on layers formed or provided on first display substrate side 41, for example display cover 48. Electrode substrate 30 (transparent dielectric layer) is formed over row electrodes 66 and has first and opposing second electrode substrate sides 31, 32. Column electrodes 61 are formed in column electrode layer 64A over electrode substrate 30. Protective layer 80 can be formed or located over column electrodes 61 to form touch screen 6. Pixels 20 are between row electrodes 66 and display substrate 40. Thus, display 8 is formed on first substrate side 41 and touch screen 6 is formed on the same side of display substrate 40. This arrangement is useful for a top-emitter display device.

Referring further to FIGS. 8-10, electrode substrate 30 is also a transparent dielectric layer having first and second sides 31, 32. Column electrodes 61 are formed on or over second electrode substrate side 32 (or on layers formed on second electrode substrate side 32). Row electrodes 66 can be formed on display substrate 40 or display cover 48 (or on layers formed on first display substrate side 41 or display cover 48). Alternatively, row electrodes 66 are formed on or over first electrode substrate side 31 (or on layers formed on first electrode substrate side 31). Display substrate 40 is laminated with electrode substrate 30 to form display apparatus 12 having display 8 and touch screen 6. In these arrangements, first electrode substrate side 31 is between electrode substrate 30 and display 8. Thus, in one embodiment, display apparatus 12 is formed by constructing layers over display substrate 40. In another embodiment, layers are separately constructed on each of display substrate 40 and electrode substrate 30 and display substrate 40 and electrode substrate 30 are then laminated together.

Figure 11:
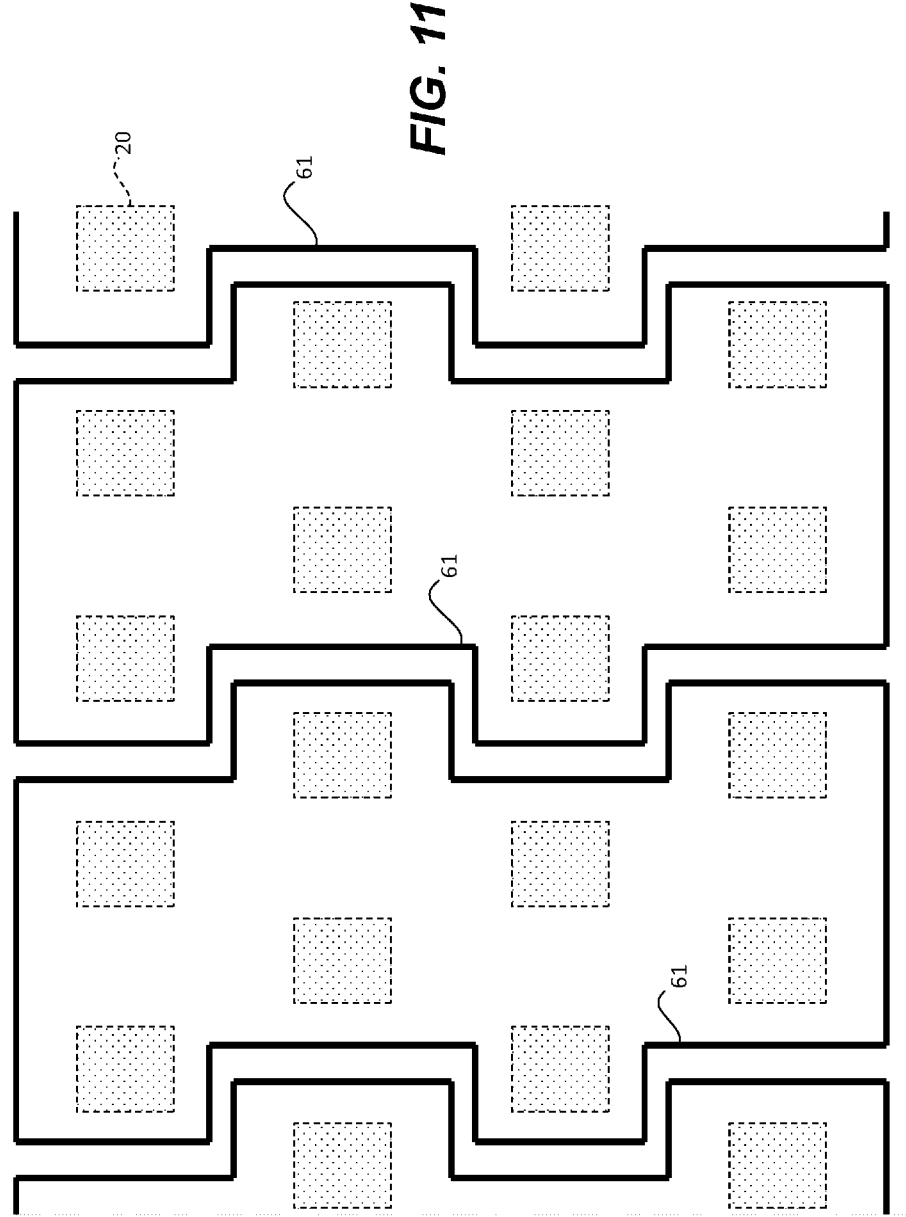
FIGS. 11 and 12 are plan views of crenellated electrodes in alternative embodiments of the present invention.
Figure 12:
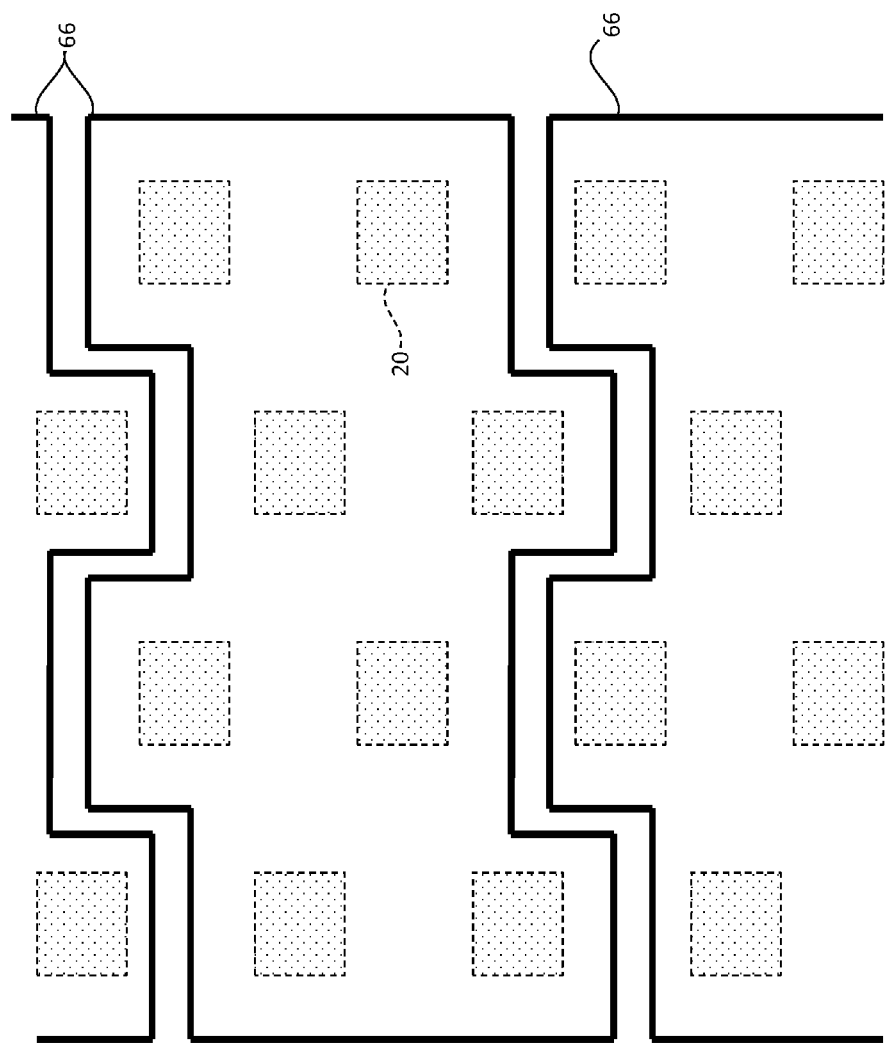

Row electrode 66 and column electrode 61 can, but need not, form a straight line. In an embodiment, alternating rows of pixels 20 are offset so that the column of pixels 20 does not form a straight line but rather forms a crenellated pattern similar to a square wave. According to an embodiment of the present invention illustrated in FIG. 11, column electrodes 61 likewise form a crenellated pattern similar to a square wave. Referring to FIG. 12, a similar arrangement is illustrated for offset columns. As illustrated in FIG. 12, alternating columns of pixels 20 are offset so that a row of pixels 20 does not form a straight line but rather forms a crenellated pattern similar to a square wave. According to an embodiment of the present invention, row electrodes 66 likewise form a crenellated pattern similar to a square wave.

As noted above with respect to electrodes 60 and illustrated in FIG. 7, in an embodiment of display apparatus 12, electrodes 60 include a plurality of electrically connected micro-wires 55, and can be partially transparent. A partially transparent electrode 60 can be at least 50% transparent, 80% transparent, 90% transparent or 95% transparent, depending on a ratio of the micro-wire 55 area to the electrode 60 area. Electrode 60 can include metal or a metal alloy, or a metal oxide.

Figure 13:
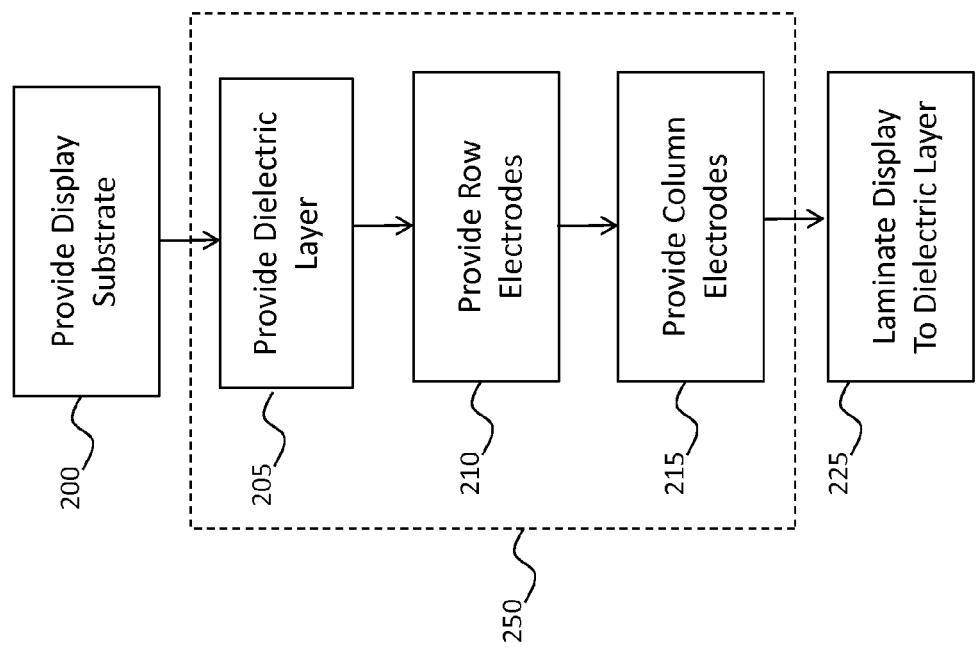
FIGS. 13-15 are flow charts illustrating various methods of the present invention.

Referring to FIG. 13 in a method of the present invention, display substrate 40 is provided 200 and electrode substrate 30 (transparent dielectric layer) provided 205. Display substrate 40 can have first display substrate side 41, second display substrate side 42 opposed to the first display substrate side 41, and an array of pixels 20 formed in rows and columns on or over the first display substrate side 41. Electrode substrate 30 (transparent dielectric layer) having row second electrode substrate side 32 and an opposed column first electrode substrate side 31 can be located over the display 8.

Row electrodes 66 are provided 210 in a layer and column electrodes 61 are provided 215 in a different layer. Each row electrode 66 in a layer extends exclusively over all of the pixels 20 in a row. Each column electrode 61 in a layer extends exclusively over all of the pixels 20 in a column. Each row electrode 66 in a layer extends exclusively over all of the pixels 20 in multiple adjacent rows. Each column electrode 61 in a layer extends exclusively over all of the pixels in multiple adjacent columns. Row electrodes 66 or column electrodes 61 can be formed with micro-wires 55.

Electrode substrate 30 (transparent dielectric layer) is laminated 225 to display substrate 40. Steps 205-215 form a step of making 250 touch screen 6. In general, methods known in the art, for example using photolithography, sputtering, mask exposures of photosensitive coatings, and etching can be used to form pixels 20 and electrodes 60 on the substrate (e.g. electrode substrate 30, display substrate 40, or display cover 48). Various elements can be sequentially formed or coated or can be separately provided and located together and the present invention includes both methods. Thus, various elements can be provided, located, or formed; all such embodiments are included in the present invention.

Figure 14:
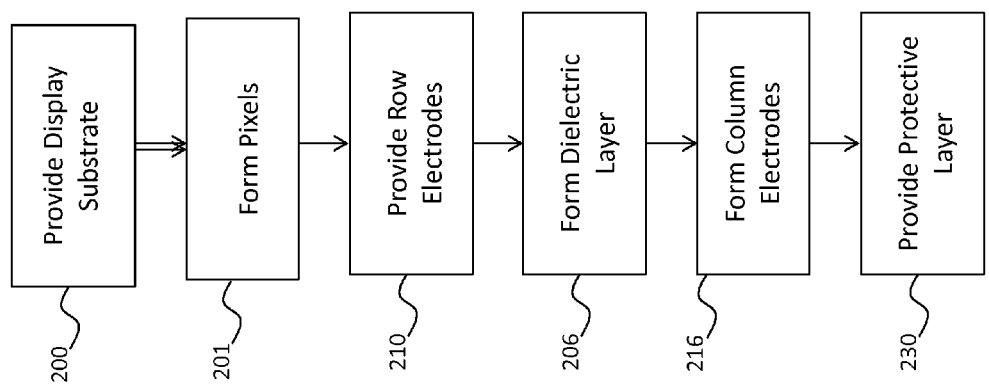

Referring to FIG. 14 in a method of the present invention, display substrate 40 is provided 200 and pixels 20 formed 201. Row electrodes 66 are provided 210, for example by forming them on a side of display substrate 40 or display cover 48 or on another protective layer 80. Electrode substrate 30 (transparent dielectric layer) is provided, located, or formed 206 over row electrodes 66. Column electrodes 61 are formed 216 on transparent dielectric layer 30. Protective layer 80 is provided, located or formed 230 over or on column electrodes 61.

Figure 15:
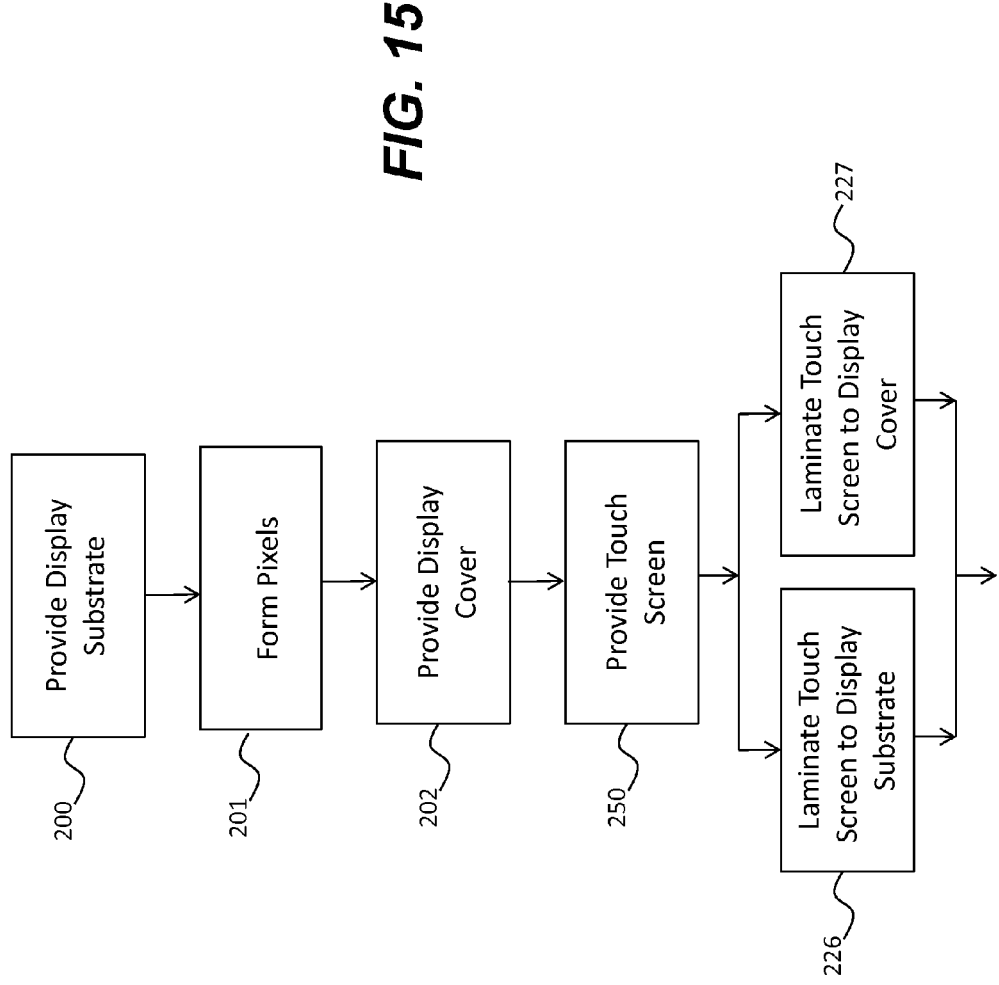

In an alternative method, referring to FIG. 15, display substrate 40 is provided 200 and pixels 20 formed 201. A display cover 48 is provided 202 over pixels 20. Touch screen 6 is formed and provided 250, for example on a separate electrode substrate 30 (transparent dielectric layer). Touch screen 6 is either laminated 226 to display substrate 40 or laminated 227 to display cover 48.

Those knowledgeable in the manufacturing arts will recognize that various versions of the methods described in FIGS. 13, 14, and 15 can be used and are included in the present invention. For example, row electrodes 66 can be formed on display cover 48 or display substrate 40 while column electrodes 61 are formed on an electrode substrate 30 and electrode substrate 30 laminated to display substrate 40 or display cover 48 over row electrodes 66.

Row electrode 66 and column electrode 61 can, but need not, form a straight line. In an embodiment, alternating rows of pixels 20 are offset so that the column of pixels 20 does not form a straight line but rather forms a crenellated pattern similar to a square wave. According to an embodiment of the present invention illustrated in FIG. 11, column electrodes 61 formed likewise form a crenellated pattern similar to a square wave. Referring to FIG. 12, a similar arrangement is illustrated for offset columns. As illustrated in FIG. 12, alternating columns of pixels 20 are offset so that the row of pixels 20 does not form a straight line but rather forms a crenellated pattern similar to a square wave. According to an embodiment of the present invention, row electrodes 66 likewise form a crenellated pattern similar to a square wave.

The present invention can provide advantages over display-and-touch-screen devices of the prior art. By locating electrodes 60 in a layer exclusively over rows or columns of pixels 20, every pixel 20 is associated with a corresponding electrode 60. As the resolution of the electrodes 60 in a touch screen approaches the resolution of the pixels 20 in a display (for example with large displays having a limited number of pixels and a limited-resolution signal) a better correspondence between touch locations over the display surface and graphic elements drawn on the screen can be obtained, improving the interactive resolution of the touch-screen-and-display system, in particular for commonly used rectangular graphic elements. By forming electrode 60 from micro-wires 55, better conductivity is provided so that larger touch screens having improved performance can be provided.

As will be readily understood by those familiar with the lithographic and display design arts, the terms row and column are arbitrary designations of two different, usually orthogonal, dimensions in a two-dimensional arrangement of pixels 20 on a surface, for example a substrate surface, and can be exchanged. That is, a row can be considered as a column and a column considered as a row simply by rotating the surface ninety degrees with respect to a viewer. Hence, row electrode 66 can be interchanged with column electrode 61 and column electrode 61 can be interchanged with row electrode 66 depending on the direction of their arrangements on a surface (e.g. a surface of electrode substrate 30 or display substrate 40). Similarly, row and column inter-electrode gaps 64, 62 are designated in correspondence to row and column electrodes 66, 61, as are row and column inter-pixel gaps 24, 22 and can be interchanged. Row electrodes 66 extend in the arbitrarily selected row direction and column electrodes 61 extend in the orthogonal column direction.

Display apparatus 12 of the present invention can be operated by using display controller 142 (as shown in FIG. 16) to control display 8 to display information with pixels 20. Touch screen controller 140 (as shown in FIG. 16) provides a voltage differential sequentially to row and column electrodes 66, 61 to scan the capacitance of the capacitor array formed where row and column electrodes 66, 61 overlap. Any change in the capacitance of a capacitor in the array can indicate a touch at the location of the capacitor in the array. The location of the touch can be related to information presented on one or more pixels 20 at the corresponding pixel location to indicate an action or interest in the information present at the corresponding pixel location.

Rectangular graphic elements can be designed and used as part of a graphic user interface (GUI) and provide good correspondence between display pixels and touch-screen locations. The design of rectangular graphic elements such as icons, menus, and buttons within graphic user interfaces is well known in the human-computer interaction arts and tools for their implementation are readily available. Such rectangular graphic elements can be presented to a user by a display controller executing a graphic interface program. User selections made by touching a touch screen are detected by a touch-screen controller and a programmed action responsive to the touch is taken, for example by a programmed computer processor.

Display device 10 of the present invention can be used in a display apparatus 12 including display 8 and capacitive touch screen 6, as illustrated in the perspective of FIG. 16. Wires 134, buss connections 136, touch-screen controller 140, and display controller 142 of FIG. 16 can be used to control and operate the display device 10 of the present invention, as discussed above with respect to FIG. 16. In response to a voltage differential provided by display controller 142 (FIG. 16) between electrodes 60 on either side of transparent dielectric layer 30, an electrical field is formed and a capacitance produced. Touch-screen controller 140 (FIG. 16) sequentially energizes electrodes 60 and senses a capacitance. The capacitance of overlapping electrode areas is changed in the presence of a conductive element, such as a finger. The change in capacitance is detected and indicates a touch.

In an embodiment, electrode substrate 30 is provided as display cover 48 or display substrate 40.

Substrates of the present invention can include any material capable of providing a supporting surface on which electrodes 60, micro-wires 55, or pixels 20 can be formed and patterned. Substrates such as glass, metal, or plastics can be used and are known in the art together with methods for providing suitable surfaces on the substrates. In a useful embodiment, substrates are substantially transparent, for example having a transparency of greater than 90%, 80% 70% or 50% in the visible range of electromagnetic radiation.

Various substrates of the present invention can be similar substrates, for example made of similar materials and having similar material deposited and patterned thereon. Likewise, electrodes 60 of the present invention can be similar, for example made of similar materials using similar processes.

Electrodes 60 of the present invention can be formed directly on substrates or over substrates on layers formed on substrates. The words "on", "over", or the phrase "on or over" indicate that electrodes 60 or micro-wires 55 of the present invention can be formed directly on a substrate, on layers formed on a substrate, or on other layers or another substrate located so that the electrodes 60 or micro-wires 55 are over the desired substrate. Likewise, electrodes 60 or micro-wires 55 can be formed under or beneath substrates. The words "on", "under", "beneath" or the phrase "on or under" indicate that the electrodes 60 or micro-wires 55 of the present invention can be formed directly on a substrate, on layers formed on a substrate, or on other layers or another substrate located so that the electrodes 60 or micro-wires 55 are under the desired substrate. "Over" or "under", as used in the present disclosure, are simply relative terms for layers located on or adjacent to opposing surfaces of a substrate. By flipping the substrate and related structures over, layers that are over the substrate become under the substrate and layers that are under the substrate become over the substrate. The descriptive use of "over" or "under" do not limit the structures of the present invention.

As used herein, micro-wires 55 are micro-wires formed in a micro-wire layer that forms a conductive mesh of electrically connected micro-wires. If electrode substrate 30 is planar, for example a rigid planar substrate such as a glass substrate, micro-wires 55 in a micro-wire layer are formed in, or on, a common plane as a conductive, electrically connected mesh. If electrode substrate 30 is flexible and curved, for example a plastic substrate, micro-wires 55 in a micro-wire layer are a conductive, electrically connected mesh that is a common distance from a surface of flexible electrode substrate 30. Micro-wires 55 can be formed on electrode substrate 30 or on a layer above (or beneath) electrode substrate 30.

In an example and non-limiting embodiment of the present invention, each micro-wire 55 is 5 microns wide and separated from neighboring micro-wires 55 in electrodes 60 by a distance of 50 microns, so that the transparent electrode is 90% transparent. As used herein, transparent refers to elements that transmit at least 50% of incident visible light, preferably 80% or at least 90%. Micro-wires 55 can be arranged in a micro-pattern that is unrelated to the pattern of electrodes 60, 66. Micro-patterns other than those illustrated in the Figures can be used in other embodiments and the present invention is not limited by the pattern of electrodes 60, 66. To achieve transparency, the total area occupied by micro-wires 55 can be less than 15% of the electrode 60 area.

Coating methods for making dielectric layers or protective layers are known in the art and can use, for example, spin or slot coating or extrusion of plastic materials on a substrate, or sputtering. Suitable materials are also well known. The formation of patterned electrical wires or micro-wires 55 on a substrate are also known, as are methods of making displays, such as OLED or liquid crystal, on a substrate and providing and assembling display covers 48 with display substrates 40.

Micro-wires 55 can be metal, for example silver, gold, aluminum, nickel, tungsten, titanium, tin, or copper or various metal alloys including, for example silver, gold, aluminum, nickel, tungsten, titanium, tin, or copper. Other conductive metals or materials can be used. Micro-wires 55 can be made of a thin metal layer. Micro-wires 55 can be, but need not be, opaque. Alternatively, micro-wires 55 can include cured or sintered metal particles such as nickel, tungsten, silver, gold, titanium, or tin or alloys such as nickel, tungsten, silver, gold, titanium, or tin. Conductive inks can be used to form micro-wires 55 with pattern-wise deposition and curing steps. Other materials or methods for forming micro-wires 55 can be employed and are included in the present invention.

Micro-wires 55 can be formed by patterned deposition of conductive materials or of patterned precursor materials that are subsequently processed, if necessary, to form a conductive material. Suitable methods and materials are known in the art, for example inkjet deposition or screen printing with conductive inks Alternatively, micro-wires 55 can be formed by providing a blanket deposition of a conductive or precursor material and patterning and curing, if necessary, the deposited material to form a micro-pattern of micro-wires 55. Photo-lithographic and photographic methods are known to perform such processing. The present invention is not limited by the micro-wire materials or by methods of forming a pattern of micro-wires 55 on a supporting substrate surface. Commonly-assigned U.S. Ser. No. 13/406,649 filed Feb. 28, 2012, the disclosure of which is incorporated herein, discloses a variety of materials and methods for forming patterned micro-wires on a substrate surface.

In embodiments of the present invention, micro-wires 55 are made by depositing an unpatterned layer of material and then differentially exposing the layer to form the different micro-wire 55 micro-patterns. For example, a layer of curable precursor material is coated over the substrate and pattern-wise exposed. The first and second micro-patterns are exposed in a common step or in different steps. A variety of processing methods can be used, for example photo-lithographic or silver halide methods. The materials can be differentially pattern-wise exposed and then processed.

A variety of materials can be employed to form patterned micro-wires 55, including resins that can be cured by cross-linking wave-length-sensitive polymeric binders and silver halide materials that are exposed to light. Processing can include both washing out residual uncured materials and curing or exposure steps.

In an embodiment, a precursor layer includes conductive ink, conductive particles, or metal ink. The exposed portions of the precursor layer can be cured to form micro-wires 55 (for example by exposure to patterned laser light to cross-link a curable resin) and the uncured portions removed. Alternatively, unexposed portions of micro-wire layers can be cured to form micro-wires 55 and the cured portions removed.

In another embodiment of the present invention, the precursor layers are silver salt layers. The silver salt can be any material that is capable of providing a latent image (that is, a germ or nucleus of metal in each exposed grain of metal salt) according to a desired pattern upon photo-exposure. The latent image can then be developed into a metal image. For example, the silver salt can be a photosensitive silver salt such as a silver halide or mixture of silver halides. The silver halide can be, for example, silver chloride, silver bromide, silver chlorobromide, or silver bromoiodide.

According to some embodiments, the useful silver salt is a silver halide (AgX) that is sensitized to any suitable wavelength of exposing radiation. Organic sensitizing dyes can be used to sensitize the silver salt to visible or IR radiation, but it can be advantageous to sensitize the silver salt in the UV portion of the electromagnetic spectrum without using sensitizing dyes.

Processing of AgX materials to form conductive traces typically involves at least developing exposed AgX and fixing (removing) unexposed AgX. Other steps can be employed to enhance conductivity, such as thermal treatments, electroless plating, physical development and various conductivity-enhancing baths, as described in U.S. Pat. No. 3,223,525.

In an embodiment, precursor material layers can each include a metallic particulate material or a metallic precursor material, and a photosensitive binder material.

In any of these cases, the precursor material is conductive after it is cured and any needed processing completed. Before patterning or before curing, the precursor material is not necessarily electrically conductive. As used herein, precursor material is material that is electrically conductive after any final processing is completed and the precursor material is not necessarily conductive at any other point in the micro-wire formation process.

Methods and devices for forming and providing substrates, coating substrates, patterning coated substrates, or pattern-wise depositing materials on a substrate are known in the photo-lithographic arts. Likewise, tools for laying out electrodes, conductive traces, and connectors are known in the electronics industry as are methods for manufacturing such electronic system elements. Hardware controllers for controlling touch screens and displays and software for managing display and touch screen systems are all well known. All of these tools and methods can be usefully employed to design, implement, construct, and operate the present invention. Methods, tools, and devices for operating capacitive touch screens can be used with the present invention.

Although the present invention has been described with emphasis on capacitive touch screen embodiments, the anisotropically conductive transparent electrodes are useful in a wide variety of electronic devices. Such devices can include, for example, photovoltaic devices, OLED displays and lighting, LCD displays, plasma displays, inorganic LED displays and lighting, electrophoretic displays, electrowetting displays, dimming mirrors, smart windows, transparent radio antennae, transparent heaters and other touch screen devices such as resistive touch screen devices.

The invention has been described in detail with particular reference to certain embodiments thereof, but it will be understood that variations and modifications can be effected within the spirit and scope of the invention.

PARTS LIST

1 cross section line
2 cross section line
6 touch screen
8 display
10 display device 12 display apparatus
20 pixel
22 inter-pixel gap, column inter-pixel gap
24 inter-pixel gap, row inter-pixel gap
26 display layer
30 electrode substrate
31 first electrode substrate side
32 second electrode substrate side
40 display substrate
41 first display substrate side
42 second display substrate side
48 display cover
55 micro-wire
57 projection line
60 electrode
61 column electrode
62 inter-electrode gap
64 electrode layer
64A column electrode layer
64B row electrode layer
66 row electrode
80 protective layer
Parts List cont'd
100 touch screen and display apparatus
110 display
120 touch screen
122 first transparent substrate
124 transparent dielectric layer
126 second transparent substrate
128 first pad area
129 second pad area
130 first transparent electrode
132 second transparent electrode
134 wires
136 buss connections
140 touch-screen controller
142 display controller
150 micro-wire
156 micro-pattern
200 provide display substrate step
201 form pixels step
202 provide display cover step
205 provide dielectric layer step
206 form dielectric layer step
210 provide row electrodes step
215 provide column electrodes step
216 form column electrodes step
225 laminate display to dielectric step
226 laminate touch screen to display substrate step
227 laminate touch screen to display cover step
230 provide protective layer step
250 provide touch screen step

The invention claimed is:

1. A display apparatus, comprising:
a display including an array of pixels formed in display rows and display columns;
a touch-screen including a solid transparent dielectric layer having a row side and an opposed column side located over the display, an array of row electrodes formed on the row side and an array of column electrodes formed on the column side;
wherein each of the row electrodes in a layer extends exclusively over all of the pixels in a corresponding display row and each of the column electrodes in a layer extends exclusively over all of the pixels in a corresponding display column, so that all of the pixels in each display row or display column are completely covered by a single row electrode or column electrode only and no other row electrode or column electrode covers any portion of any of the pixels in the display row or display column, and so that each row electrode or column electrode only covers all of the pixels in a display row or display column and no row electrode or column electrode covers at least a portion of one but less than all of the pixels in a display row or display column.

2. The display apparatus of claim 1, wherein one or more of the row or column electrodes extends exclusively over all of the pixels in multiple adjacent rows or columns.

3. The display apparatus of claim 1, wherein the row or column electrodes include micro-wires.

4. The display apparatus of claim 1, wherein the row or column electrodes are partially transparent.

5. The display apparatus of claim 1, wherein the display includes a display substrate and the transparent dielectric layer is in a common stack with the display substrate.

6. The display apparatus of claim 1, wherein the transparent dielectric layer is an electrode substrate having a first electrode substrate side and a second electrode substrate side opposed to the first electrode substrate side and the row or column electrodes are formed on or over the first electrode substrate side.

7. The display apparatus of claim 1, wherein the display includes a display substrate having a first display substrate side and a second display substrate side opposed to the first display substrate side and the pixels are formed on or over the first display substrate side.

8. The display apparatus of claim 7, wherein the row or column electrodes are formed on or over the second display substrate side.

9. The display apparatus of claim 7, wherein the row or column electrodes are formed on or over the first display substrate side.

10. The display apparatus of claim 7, wherein the transparent dielectric layer is the display substrate.

11. The display apparatus of claim 7, further including a display cover located over the pixels and the electrodes are formed on or over the display cover.

12. The display apparatus of claim 7, further including a display cover located over the pixels and the transparent dielectric layer is the display cover.

13. The display apparatus of claim 7, wherein the display substrate is laminated to the transparent dielectric layer.

14. The display apparatus of claim 1, wherein adjacent rows or columns of pixels are offset.

15. The display apparatus of claim 14, wherein one or more row or column electrodes are not rectangular.

16. The display apparatus of claim 15, wherein one or more row or column electrodes have a crenellated pattern.

17. The display apparatus of claim 1, wherein each pixel is completely covered by a single row electrode and a single column electrode.

* * * * *